(12) United States Patent
Ward

(10) Patent No.: US 12,420,328 B1
(45) Date of Patent: Sep. 23, 2025

(54) SET UP TOOL FOR CAN SEAMER MACHINES

(71) Applicant: Pneumatic Scale Corporation, Cuyahoga Falls, OH (US)

(72) Inventor: Timothy D. Ward, New Smyrna Beach, FL (US)

(73) Assignee: PNEUMATIC SCALE CORPORATION, Cuyahoga Falls, OH (US)

( * ) Notice: Subject to any disclaimer, the term of this patent is extended or adjusted under 35 U.S.C. 154(b) by 685 days.

(21) Appl. No.: 17/873,299

(22) Filed: Jul. 26, 2022

Related U.S. Application Data

(60) Provisional application No. 63/227,849, filed on Jul. 30, 2021.

(51) Int. Cl.
*B21D 51/26* (2006.01)
*G01B 5/04* (2006.01)

(52) U.S. Cl.
CPC ......... *B21D 51/2653* (2013.01); *G01B 5/043* (2013.01)

(58) Field of Classification Search
CPC ............ B21D 51/2661; B21D 51/2676; B21D 51/2684; B21D 51/32; B21D 51/263; B21D 51/2615; B21D 51/2653; B21D 51/2638; B23D 31/001; Y10T 82/2516; B67C 7/00

USPC .......................................................... 33/700
See application file for complete search history.

(56) References Cited

U.S. PATENT DOCUMENTS 2,680,419 A * 6/1954 Peterson, Jr. .......... B21D 51/32
413/30

FOREIGN PATENT DOCUMENTS

EP          0570005 A2 * 11/1993

* cited by examiner

*Primary Examiner* — Laura Martin
*Assistant Examiner* — Yohanes Melese Tafete
(74) *Attorney, Agent, or Firm* — Ralph E. Jocke; WALKER & JOCKE

(57) ABSTRACT

A can seamer machine set up tool (56) is used to set and verify dimensional relationships, orientations and operational tolerances of components in a can seamer machine (10). The exemplary tool includes a can plug (58) that is configured to engage a lower chuck (66) of the machine. A seaming chuck gage (60) is configured to engage a seaming chuck (36) of the machine. The exemplary tool is configured to enable set up activities at a makeup angular position of a can seaming turret (18) without the need to remove components from the machine such as the seaming chuck, a lid knockout pad, or seaming levers and seaming rolls.

24 Claims, 23 Drawing Sheets

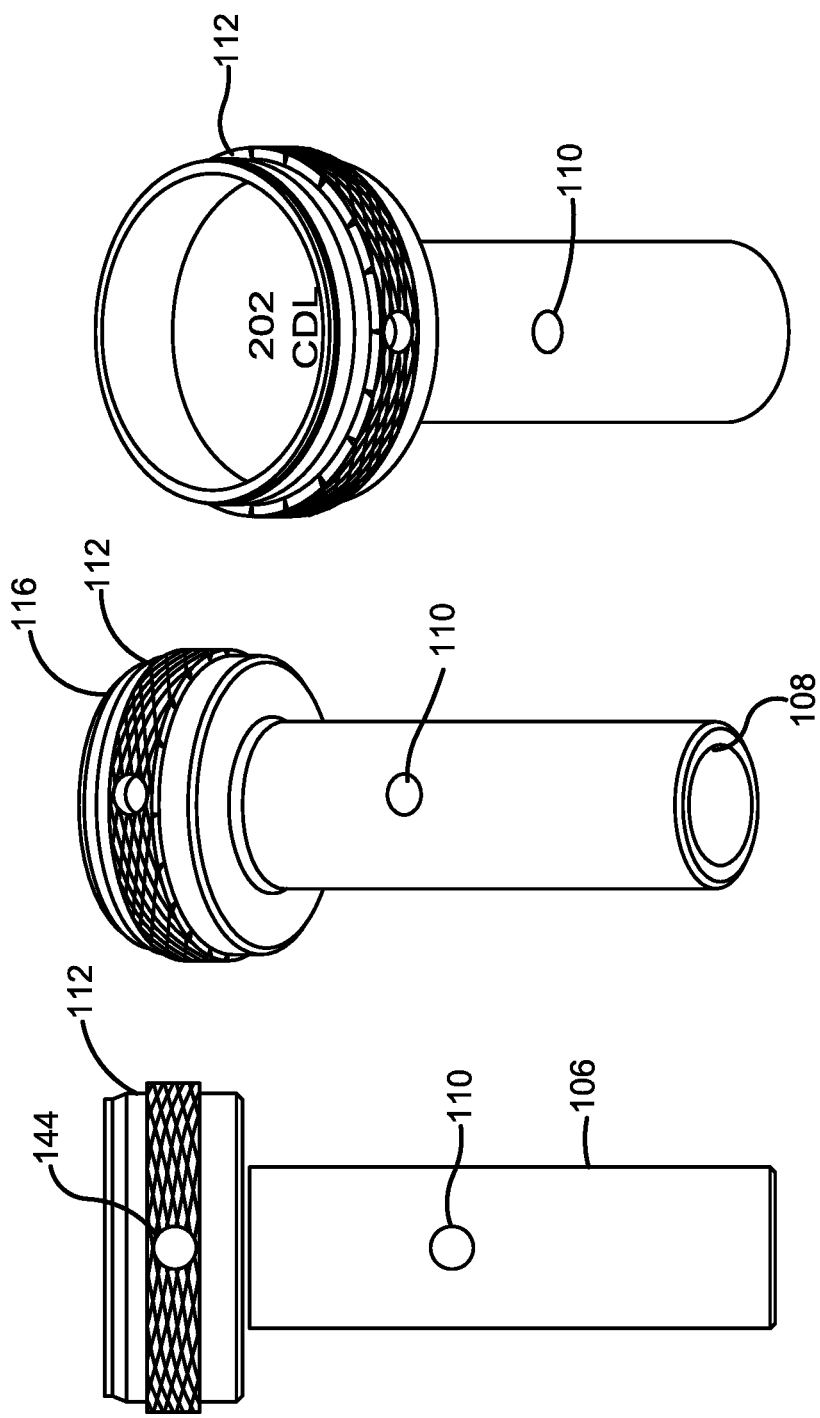

SET UP TOOL FOR CAN SEAMER MACHINES

TECHNICAL FIELD

Exemplary arrangements relate to can seamer machines. Exemplary arrangements relate to a set up tool for a can seamer machine that is usable to properly position and orient can seamer machine components for proper operation.

BACKGROUND

Can seamer machines operate to place lids, which are alternatively referred to as ends, on cans. Often can seamer machines operate to place lids on cans that hold products such as beverages. Can seamer machines further operate to permanently engage the lid to the can body by forming an annular seam about a periphery of the lid and the can top. The seam in combination with a sealing compound which often is applied to the seam area of the lid prior to engagement with the can, produces an air tight seal. The formation of the air tight seal helps to preserve the product inside the can.

Can seamer machines commonly run at high rates of speed and require precise positioning of the components in order to produce quality can seams and finished cans. Such machines commonly require periodic set up to assure that critical machine components are properly oriented and have appropriate tolerances for the can size and type that is being processed by the machine.

To properly set up the machine which commonly includes having to measure, orient, align and position certain machine components, it is common to remove components of the machine. Components that commonly have to be removed for machine set up include a seaming chuck which holds the lid of the can during seaming operations and a knockout pad which moves axially within a recess of the seaming chuck to position and release can lids. Other components which commonly have to be removed for machine set up include seaming levers which hold the seaming rolls which form the can seams. Removing these items from the can seaming machine to perform the necessary set up activities, and then reinstalling them, may cause misalignment and other problems which can adversely impact machine operation. In addition the time required to remove the components to perform the set up activities, and then reinstall them, causes a loss of production time for the machine.

Devices and methods used to set up can seaming machines may benefit from improvements.

SUMMARY

Exemplary arrangements relate to a set up tool for a can seamer machine. The exemplary set up tool enables machine set up without the need to remove a seaming chuck, knockout pad and seaming lever. Exemplary arrangements further relate to methods for can seaming machine set up which can be performed quickly and without the need to remove machine components.

Additional exemplary arrangements of devices and methods which may be beneficial to the set up and operation of can seamer machines are described in the following Detailed Description.

BRIEF DESCRIPTION OF DRAWINGS

FIG. 8 is a front view of an exemplary seaming chuck gage of the exemplary set up tool.

FIG. 9 is a bottom front perspective view of the seaming chuck gage.

FIG. 10 is a front top perspective view of the exemplary seaming chuck gage.

DETAILED DESCRIPTION

Figure 1:
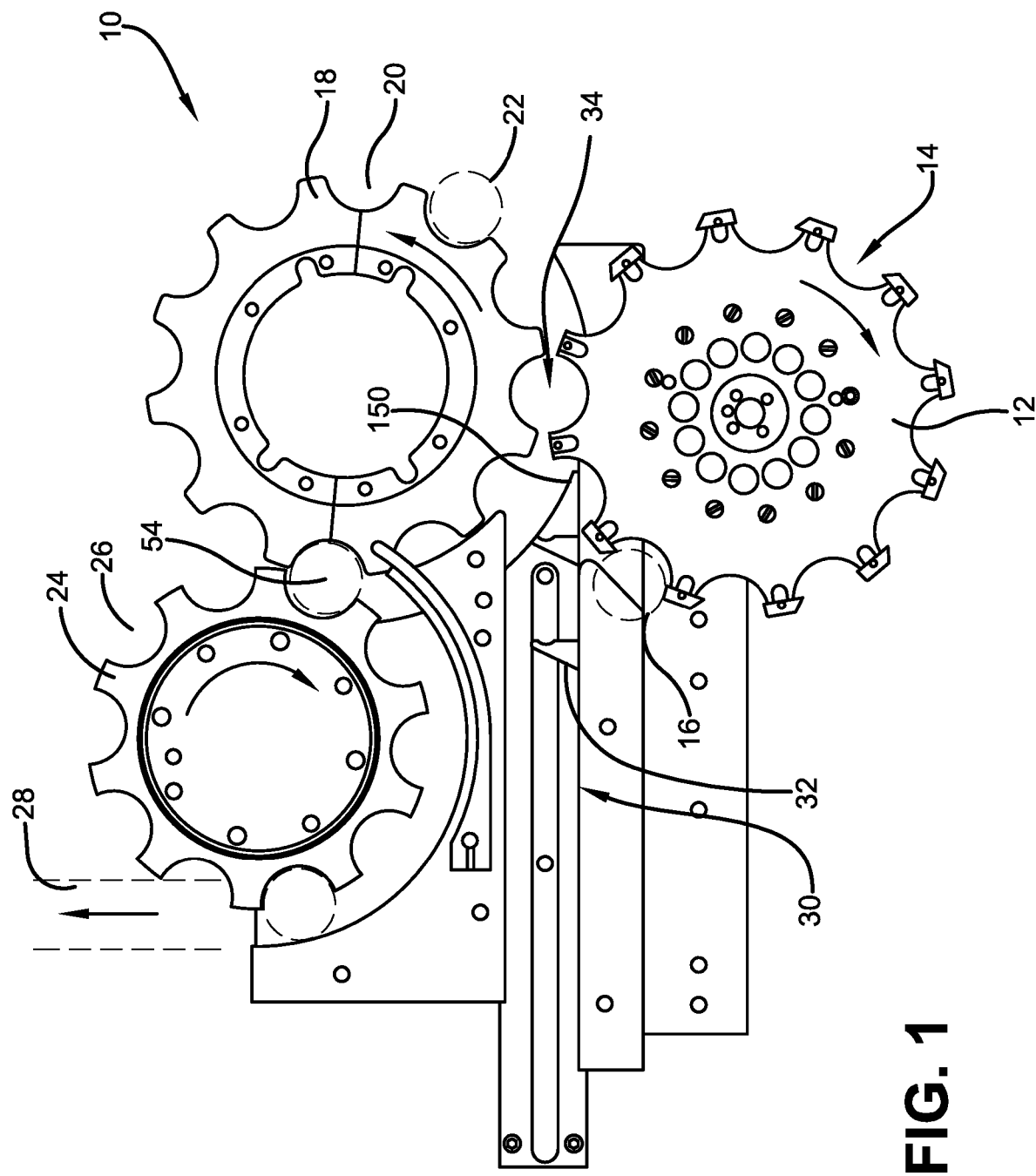
FIG. 1 is a schematic top view of in exemplary can seamer machine

Referring now to the drawings and particularly to FIG. 1 there is shown schematically a top view of a can seamer machine generally indicated 10. The exemplary machine operates to close and seal cans such as aluminum cans that hold products such as beverages or other food items. The exemplary machine includes a rotatable lid feeding turret 12. Lid feeding turret 12 includes a plurality of uniformly angularly spaced pockets 14. Each pocket 14 is configured to hold a can lid 16 therein an example of which is shown in phantom. During operation of the machine, can lids are fed into the pockets such that each pocket holds a can lid as the lid feed turret moves the lid into position to be attached to a can body.

The lid feed turret rotates in a controlled manner to carry the can lids into proximity with a rotatable can seaming turret 18. Can seaming turret 18 includes a plurality of uniformly angularly spaced pockets 20. Each pocket is configured to receive and move therein a cylindrical can body such as can body 22 shown in phantom. During operation, the can seaming turret holds and transports cans with engaged lids while annular can seams are formed to join each lid to a can body in sealed relation.

The can seaming turret 18 transports cans while the can seams are formed and releases the cans to a rotatable discharge turret 24. The discharge turret 24 includes a plurality of equally angularly spaced pockets 26, each of which is configured to hold and move a can. The discharge turret 24 transports the cans to a discharge conveyor 28.

The exemplary can seaming machine further includes a can feed conveyor 30. The exemplary can feed conveyor 30 selectively moves cans into engagement with the can seaming turret 18 through engagement with moveable can engaging projections 32. The exemplary can engaging projections are attached to a feed chain which selectively moves the can bodies to which lids have not yet been engaged, in precise timed relation into engagement with the pockets of the can seaming turret.

Figure 2:
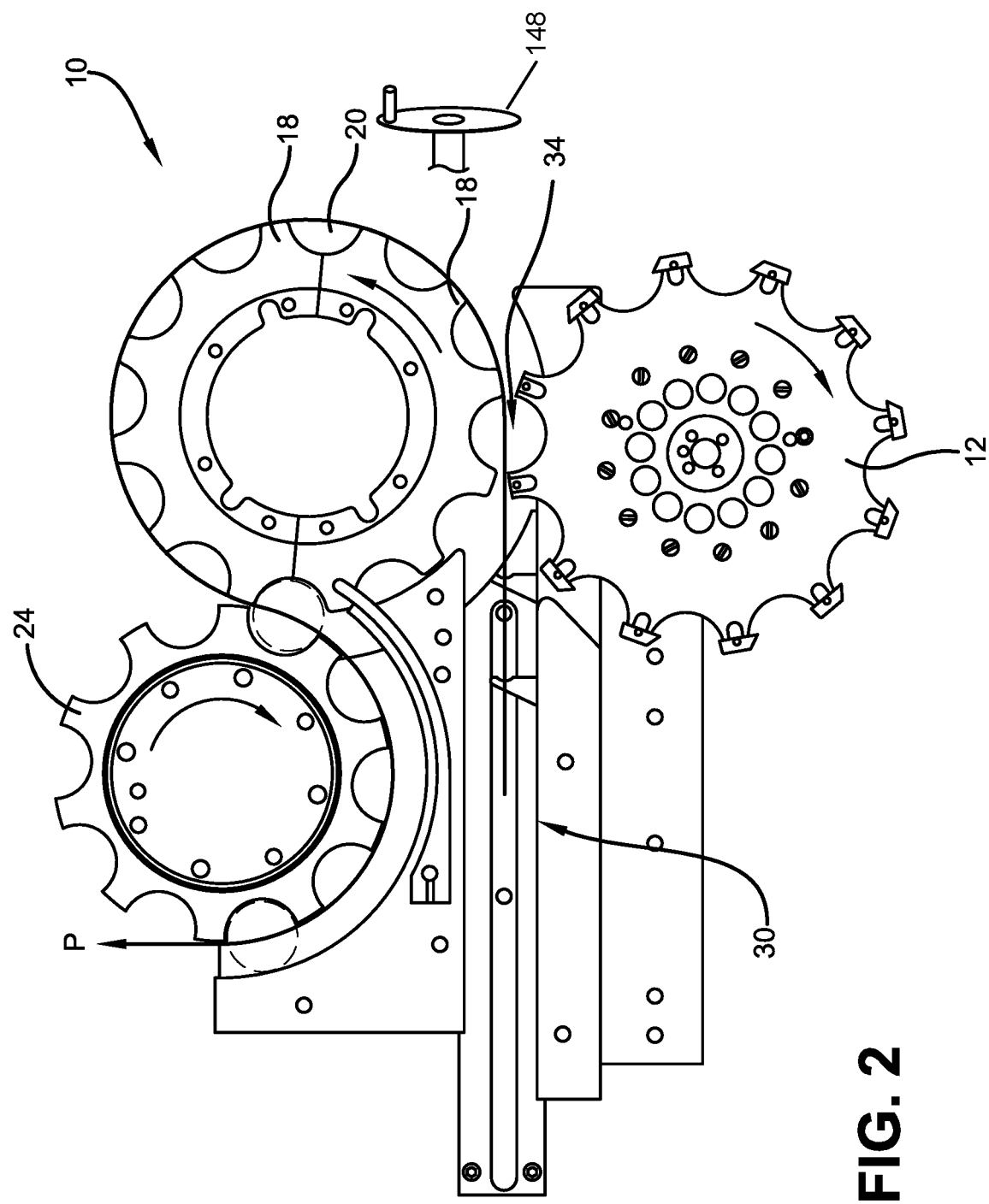
FIG. 2 is a schematic view of a can seamer machine similar to FIG. 1 showing the path of cans through the machine.

Arrow P in FIG. 2 shows an exemplary path of cans through the exemplary can seamer machine 10. Of course it should be understood that the exemplary machine is configured for handling a particular size of can and a particular size and type of can lid. Further it should be understood that this machine configuration is exemplary and other machine arrangements and configurations may be used.

In the exemplary machine the can body which generally is filled with product such as a beverage, is moved through operation of the can feed conveyor 30, to the can seaming turret 18, and simultaneously a lid is moved through operation of the lid feed turret, to a makeup position 34. In the exemplary machine 10 the can and the lid are positioned in axially aligned relation at the makeup position which is a rotational position of the can seaming turret 18 and the lid feed turret 12 in which the respective pockets thereof are in vertical alignment. In the makeup rotational position of the exemplary arrangement, the can lid is moved through operation of a knockout pad associated with a seaming chuck as later described to engage the can opening at the top of the can in centered relation. The bottom of the can is supported on a lower chuck of the machine that is in axial alignment with the seaming chuck. Both the seaming chuck and the lower chuck rotate in a controlled manner about their common vertical axis, as the can seaming turret rotates about its central axis.

Figure 3:
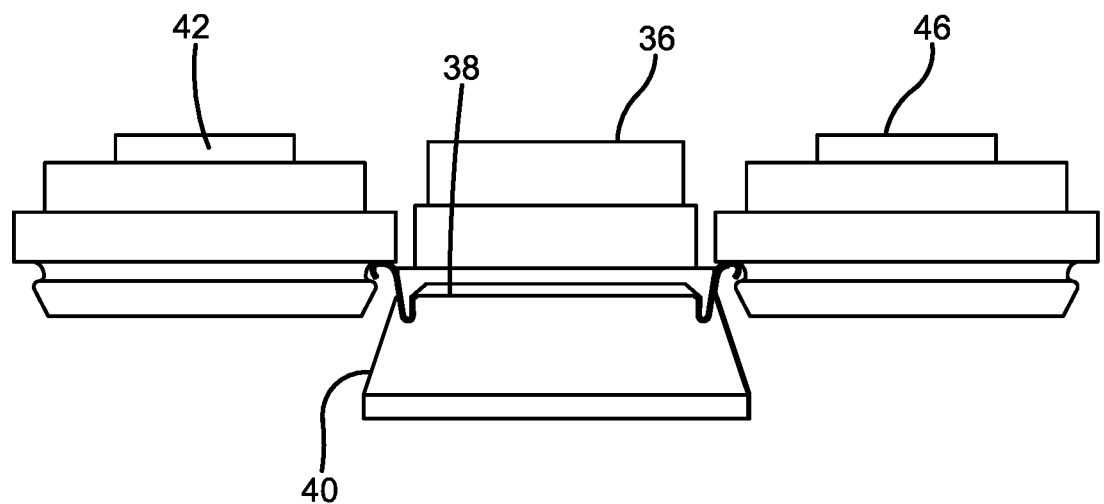
FIG. 3 is a schematic view showing a seaming chuck in engagement with the a can lid and seaming rolls that operate to form a can seam.
Figure 4:
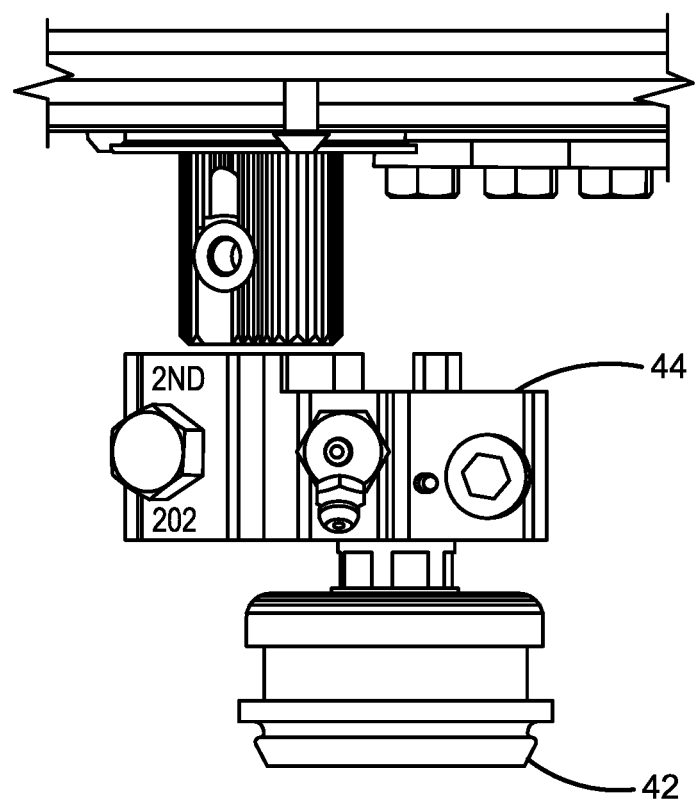
FIG. 4 shows an exemplary seaming lever with a seaming roll attached, along with a splined shaft that is used during machine operations to position the seaming roll.

As the can seaming turret rotates to carry the can away from the makeup rotational position, a seaming chuck 36 shown schematically in FIG. 3 engages and rotationally moves the can lid 38 which is engaged in the can body opening of a can 40. Axial compressive force is applied by both the seaming chuck and the lower chuck to the can, which holds the can in engaged relation with the seaming chuck and the lower chuck. As the can is rotated about the vertical axis of the can, and moved by the can seaming turret 18, a first operation seaming roll 42 operates to curl the lid around a flange at the top of the can by engaging the lid and can. In the exemplary arrangement the seaming roll operates by moving rotationally in supported connection with the seaming lever 44 to engage the rotating lid and top flange of the can to perform the first operation.

Figure 5:
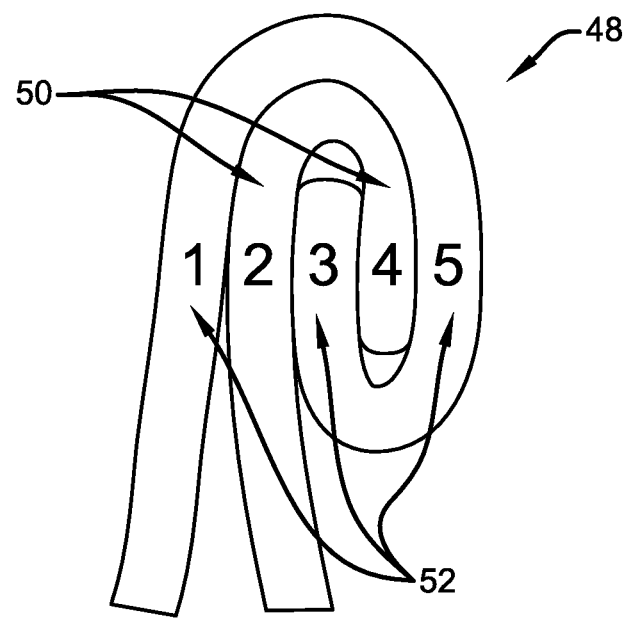
FIG. 5 is a cross-sectional view of an exemplary can seam.

After the first seaming roll 42 operates to curl the lid and flange in the desired manner, the lid and flange are engaged with a second seaming roll 46. Second seaming roll 46 operates as the can is rotated about the vertical can axis to iron and radially compress the flange portion of the can and the lip of the lid into the final configuration of the can seam. FIG. 5 shows a cross-section of an exemplary seam 48 which shows the final configuration of the curled flange 50 of the can body and the lip 52 of the lid. Further it should be understood that in exemplary arrangements the lip of the lid and/or the flange of the can has a sealing compound layer thereon. The layer of sealing compound is operative to further assure that an air tight seal is provided when a proper seam has been formed. In the exemplary machine the can seam is formed through rotation of the can about its vertical axis within the respective pocket of the can seaming turret 18, during the rotation of the can seaming turret 18 between the makeup position and a transfer position 54 at which cans are transferred to the discharge turret 24. In the exemplary arrangement the formation of the seam occurs through engagement of the seaming rolls and the can and lid in a sequential continuous ongoing process during movement of the can within the pocket in the can seaming turret. Of course it should be understood that this approach is exemplary and other arrangements other approaches may be used.

Figure 6:
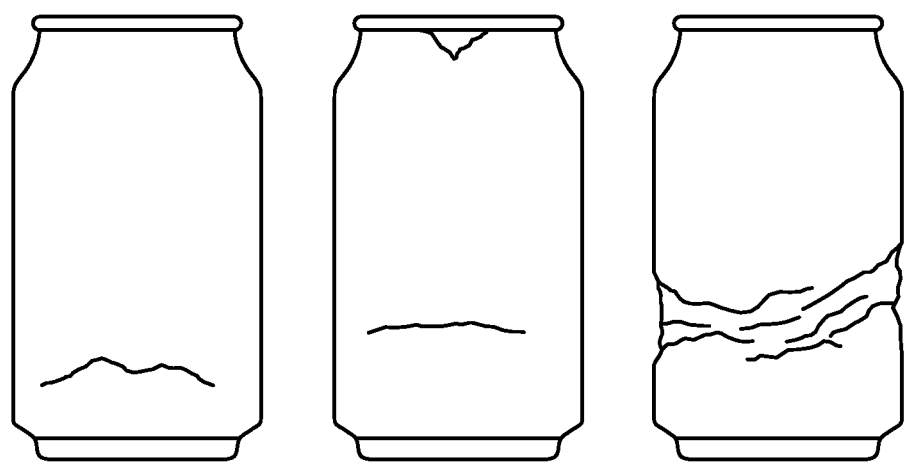
FIG. 6 shows damaged cans that can be produced as a result of improper set up of a can seamer machine.
Figure 7:
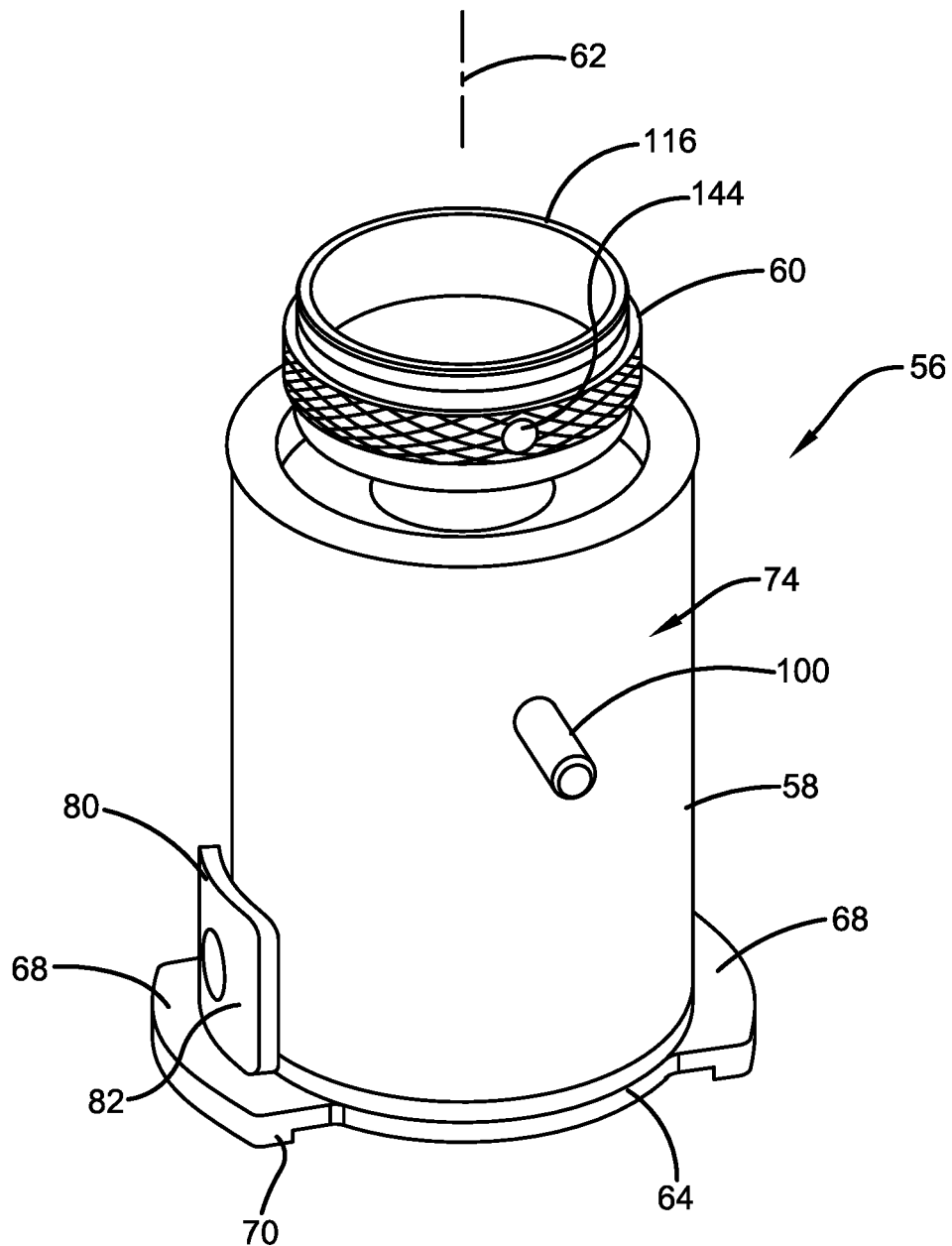
FIG. 7 is a top front right perspective view of an exemplary set up tool for a can seamer machine.

For the proper engagement of can lids and the formation of proper can seams, the components of a can seamer machine must be precisely positioned in order to properly handle and close the can. Particularly critical are the positions of the components which position, guide, engage and move the can and lid at the makeup rotational position 34. It is critical that the seaming chuck, lower chuck and turret pocket at the makeup rotational position be precisely angularly aligned. Further it is critical that the can engaging projections 32 of the feed chain and can guides be properly positioned to assure that cans are accurately oriented in engagement with the components of the can seamer. Consideration must also be given to dimensional variations that occur with cans and lids due to manufacturing tolerances. Failure to allow for dimensional variations can result in damaged cans and machine malfunctions. FIG. 6 shows examples of damaged cans which can be produced by the can seamer machine as a result of improper set up. As can be appreciated with the high production speeds of exemplary can seamers, a large quantity of cans that must be scrapped can be produced very quickly in the event that machine components are not properly configured and oriented.

As previously discussed for many types of can seamer machines, machine setup has involved removing seaming chucks, knockout pads, seaming levers and rolls and other items from the machine to properly configure the can seaming turret, can guides, can engaging projections of the feed chain and other components to be in their appropriate positions and with proper tolerances. Disassembling and removing these components from the machine, checking distance values and adjusting machine components and reinstalling removed components may take several hours. Further as can be appreciated, damage or misalignment can occur when reinstalling components of the machine. This can further prolong machine downtime.

An exemplary can seamer machine setup tool 56 is usable to set up a can seamer machine without the need to remove a seaming chuck, knockout pad or seaming levers. The exemplary tool comprises a can plug 58. The tool further includes a seaming chuck gauge 60. The seaming chuck gauge 60 and the can plug 58 are relatively axially and rotationally movable along a central tool axis 62.

The exemplary can plug 58 is generally cylindrical in shape. For purposes hereof generally cylindrical refers to at least half of a circumferential surface being uniformly circular.

The exemplary can plug 58 includes a plug base 64. The plug base 64 is configured to engage an upper surface of a cylindrical lower chuck 66 of the can seamer machine. In an exemplary arrangement the plug base includes a plus base recess that is configured to receive at least the upper portion of the lower chuck therein. The exemplary plug base recess holds the lower chuck in centered relation with the recess and the can plug, while enabling relative rotational movement about the central axis of the plug base and the lower chuck. In some exemplary arrangements the recess may be bounded by a continuous radially outward bounding wall, while in other exemplary arrangements the recess may be bounded by a plurality of discrete angularity separated feet or other bounding members. The exemplary plug base is in operative connection with a pair of uniformly angularly spaced radially extending feet 68. Each foot 68 extends radially outward from the plug base 64. Each foot includes in axial cross-section, an axially extending centering projection 70. In the exemplary arrangement the centering projection of each foot in cross-section extends generally parallel to the axis 62. As used herein generally parallel refers to parallel+/−30°. Each exemplary foot includes a semicircular centering projection. The centering projection bounds the plug base recess and is configured to engage an annular periphery 72 of the lower chuck 66 so as to axially center the can plug 58 and the plug base 64 relative to the lower chuck 66. In the exemplary arrangement the centering projections 70 engage the annular outer periphery of the lower chuck 66 in axially and rotatably movable relation. This enables the can plug 58 to be relatively rotationally moved relative to the lower chuck and to also be disengaged therefrom by axial movement upward relative to the lower chuck.

It should be understood that the semicircular centering projections shown are exemplary and in other arrangements other configurations of the plug base recess and/or centering projections may be used. For example in some arrangements a continuous fully circular centering projection may be utilized. In other arrangements discrete angularly disposed projections may extend parallel to the axis in disposed angular locations. Further it should be understood that the centering projections may be tapered so as to facilitate the precise centered engagement of the can plug 58 or one or more external surfaces thereof, relative to the upper surface and/or outer periphery of the lower chuck 66 as the can plug is moved axially into engagement with the lower chuck. Of course different configurations of centering elements may be utilized in different arrangements.

The exemplary can plug further includes a generally cylindrical plug reference surface 74. The exemplary plug reference surface 74 is uniformly disposed from the plug base 64 an axial distance that corresponds to a location of a semicircular can seaming turret pocket surface 76. As previously discussed, in the exemplary arrangement the can seaming turret includes a plurality of turret pockets 20 that are each bounded by respective semicircular turret pocket surfaces 76. This includes each turret pocket when it is in the makeup rotational position. As later explained, in the exemplary arrangement the uniform axial distance that the plug reference surface is axially disposed from the plug base assures that in use of the tool the plug reference surface is in horizontally aligned relation with the immediately adjacent turret pocket surface in the makeup rotational position.

In the exemplary arrangement the generally cylindrical plug reference surface 74 extends at a uniform radial distance from the axis 62 that has a corresponding relationship to the outside diameter of cans that have lids engaged therewith through operation of the machine. For example in exemplary arrangements the uniform radial distance of the plug reference surface 74 from the axis corresponds to a maximum can diameter that is within specification for the type of can handled by the machine, at the level away from the lower chuck at which the can engages the current pocket surface 76. Thus as later explained, the set up tool is usable to assure that there is a desired clearance distance between the plug reference surface and the entire semicircular turret pocket surface of a pocket at the makeup rotational position, for purposes of assuring alignment of the seaming turret, the seaming chuck and the lower chuck.

Further in the exemplary arrangement the can plug 58 includes at least one other reference surface which is disposed at a selected axial distance from the plug base 64. These other reference surfaces correspond in the exemplary arrangement, to the positions of can engaging surfaces of guides which are alternatively referred to as guide rails. As later discussed, such guides operate to guide and position cans adjacent to the makeup rotational position. In some exemplary arrangements the other reference surfaces may correspond to generally cylindrical surfaces on the exterior of the can plug that enable the correct distance between the reference surface and the engaging surface of the can guide rail or other structure at the makeup position to be verified. Further in some exemplary arrangements the outer surface of the can plug may be generally uniformly circular at specific axial distances from the plug base so that the desired distance between the reference surface and the surface of the guide rail structure can be determined and verified in numerous different angular orientations of the can plug. Of course these approaches are exemplary and in other arrangements other approaches may be used.

Figure 14:
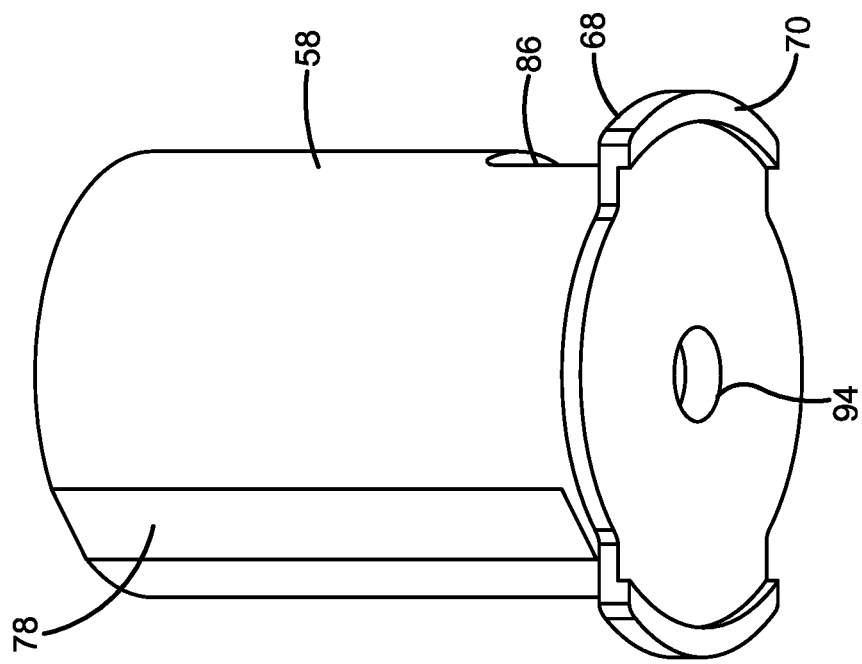
FIG. 14 is a bottom perspective view of the can plug.
Figure 13:
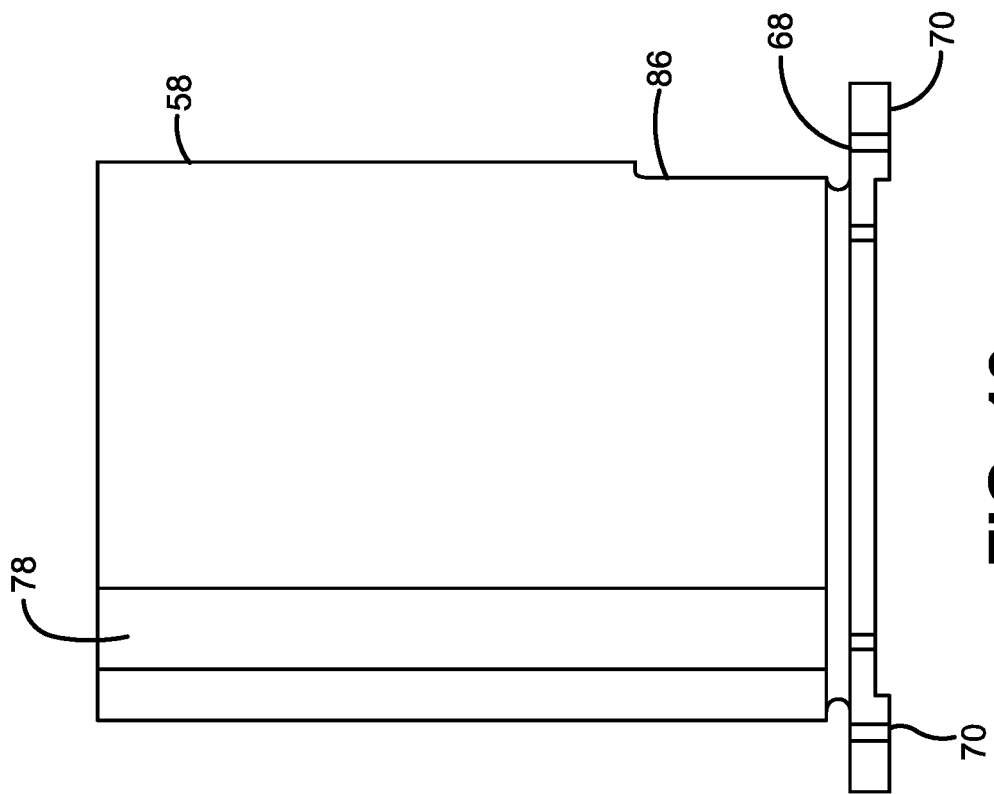
FIG. 13 is a side view of the exemplary can plug.
Figure 24:
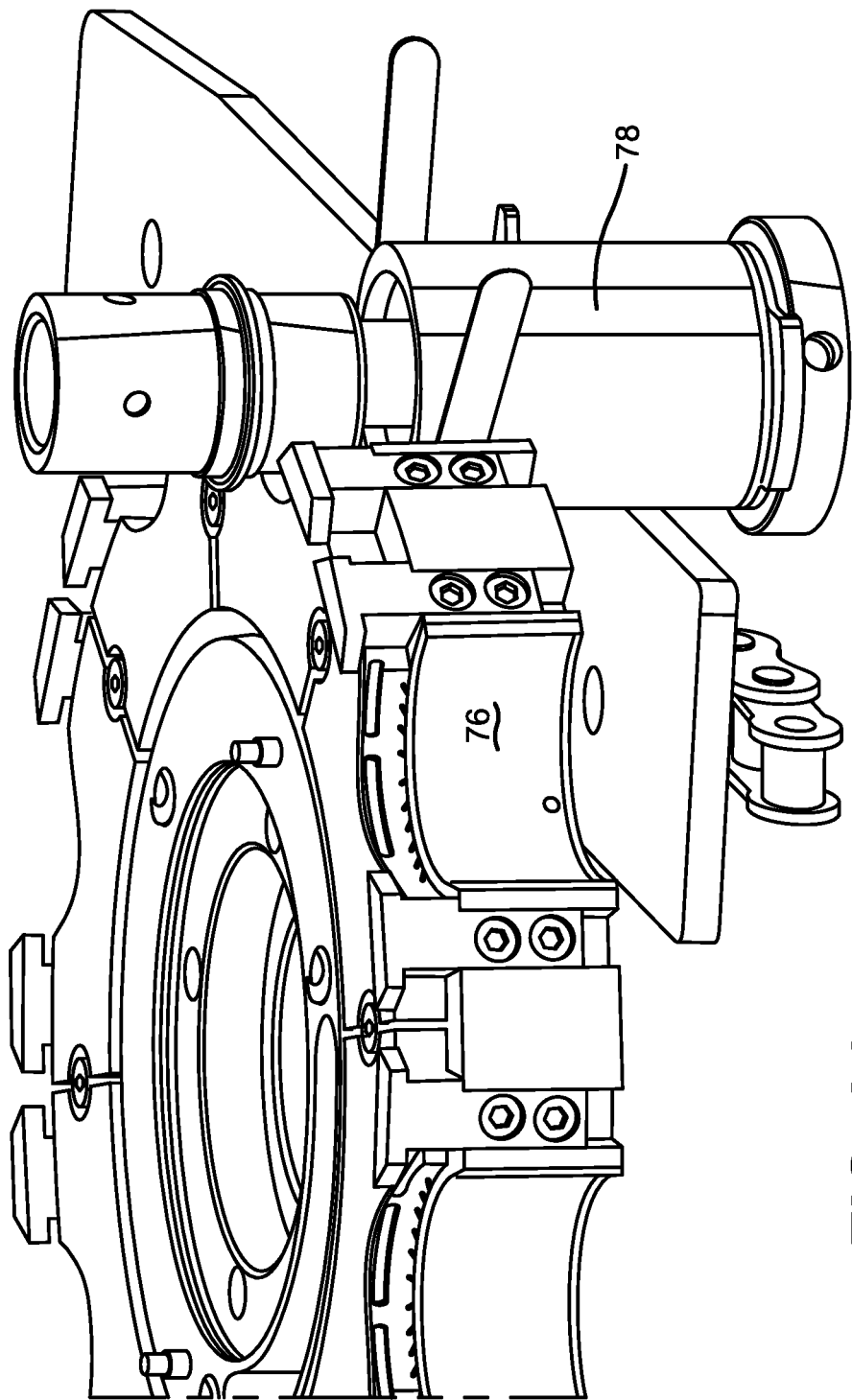
FIG. 24 is a top perspective view of the exemplary set up tool positioned in the turret pocket and a can feed inlet rail adjacent to the can plug.

In an exemplary arrangement an outer reference surface of the can plug may include an outer recess surface 78 such as is shown in FIGS. 13, 14 and 24. The exemplary outer recess surface extends outward from the axis 62 a recess radial distance, which is less than the reference surface radial distance from the axis on the angularly adjacent sides thereof. In the exemplary arrangement the outer recess surface comprises an axially elongated flat spot on the outer surface of the can plug. In the exemplary arrangement the outer recess surface extends the recess radial distance outward from the axis along the entire axial length of the outer recess surface. Of course it should be understood that this arrangement is exemplary and in other arrangements an outer recess surface may extend only at a particular angular or axial location or locations on the outer surface of the can plug.

In exemplary arrangements the outer recess surface is utilized for purposes of avoiding contact between the can plug and certain structures such as guide rails when the tool is moved in the machine to the makeup rotational position. In certain exemplary arrangements the absence of an outer recess surface may cause contact and interference with certain structures in the machine. This may include for example a can guide rail that extends adjacent to the makeup rotational position. The presence of the outer recess surface (or multiple such surfaces) on the can plug may be utilized to avoid undesirable contact and interference with one or more machine structures which may interfere with the use of the tool or the movement thereof to the desired position within the machine. Of course it should be understood that these approaches are exemplary and other arrangements other approaches may be used.

The exemplary can plug 58 further includes a radially extending chain timing projection 80. The exemplary chain timing projection 80 has an outer reference surface 82 that extends a selected radial distance from the axis 62. The radial distance from the axis at which the reference surface 82 extends corresponds to a desired tolerance distance between a can engaging surface of the can engaging projection 32 of the feed chain, and the tool in the makeup rotational position.

Figure 11:
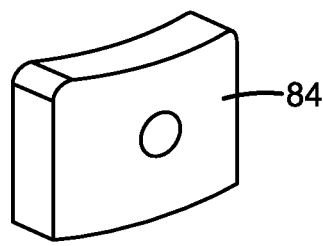
FIG. 11 is a top front perspective view of a chain timing projection insert of the set up tool.
Figure 12:
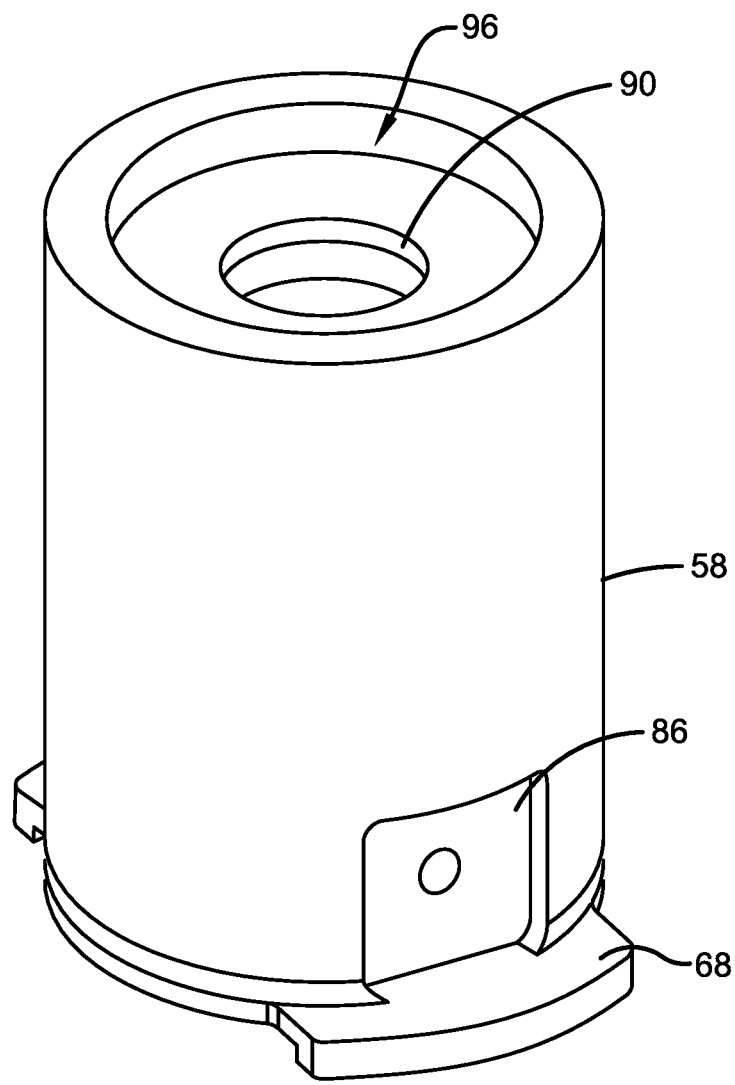
FIG. 12 is a top perspective view of an exemplary can plug of the set up tool, shown with the chain timing projection insert removed therefrom.

In the exemplary arrangement the chain timing projection comprises a chain timing projection insert 84 that is releasably positionable in an insert recess 86 in the can plug. As shown in FIGS. 11 and 12 the exemplary insert 84 and the can plug each include fastener accepting apertures that enable the insert to be releasably engaged in fixed connection with the can plug 58. In the exemplary arrangement the reference surface of the chain timing projection insert extends uniformly outward from the axis about a partial external circumferential portion of the can plug.

In exemplary arrangements at least one dimension of the chain timing projection insert corresponds to the particular type of can seaming machine which is to be set up through operation of the tool. The type of machine may correspond to a particular size or model of the machine, or the particular size or type of can that is processed by the machine. The different dimensions of the reference surface may correspond to a specific radial distance from the central axis, an axial height from the plug base or other dimensions that provides reference surface(s) that need to be used for purposes of making the determination of at least one tolerance dimension. In exemplary arrangements numerous different chain timing inserts may be provided with the set up tool to enable the tool to be adapted for different types of machines. Of course in other arrangements the reference surface may be at least one fixed surface on the exterior of the can plug, rather than a changeable insert.

As later discussed in the exemplary arrangement the particular insert is configured so that when the tool is in the makeup position the outer reference surface 82 is positionable to be in immediately adjacent facing relation with the can engaging projection 32 of the can feed chain. This enables a chain tolerance between the reference surface and the surface of the chain engaging projection on the feed chain to be measured and verified as within the desired specification. Of course it should be understood that these approaches are exemplary and in other arrangements other approaches may be used.

The exemplary can plug further includes an axially extending plug bore 88. Plug bore 88 extends in the can plug 58 from a plug bore opening 90. The plug bore is configured to receive therein a stem of the exemplary seaming chuck gage in axially and rotationally movable relation as later discussed. The plug bore 88 further includes therein an annular recess which is configured to house an annular resilient seal 92. The exemplary plug bore 88 terminates in a opening 94 in the plug base 64. The opening 94 can serve as a vent opening as later discussed.

The exemplary can plug 58 further includes an annular can plug recess 96. The can plug recess 96 extends inwardly in the axial end of the can plug opposite the plug base. The can plug recess 96 extends in surrounding relation of the plug bore opening 90. The can plug recess 96 is configured to enable a head of the seaming chuck gage to extend therein as later discussed.

Figure 15:
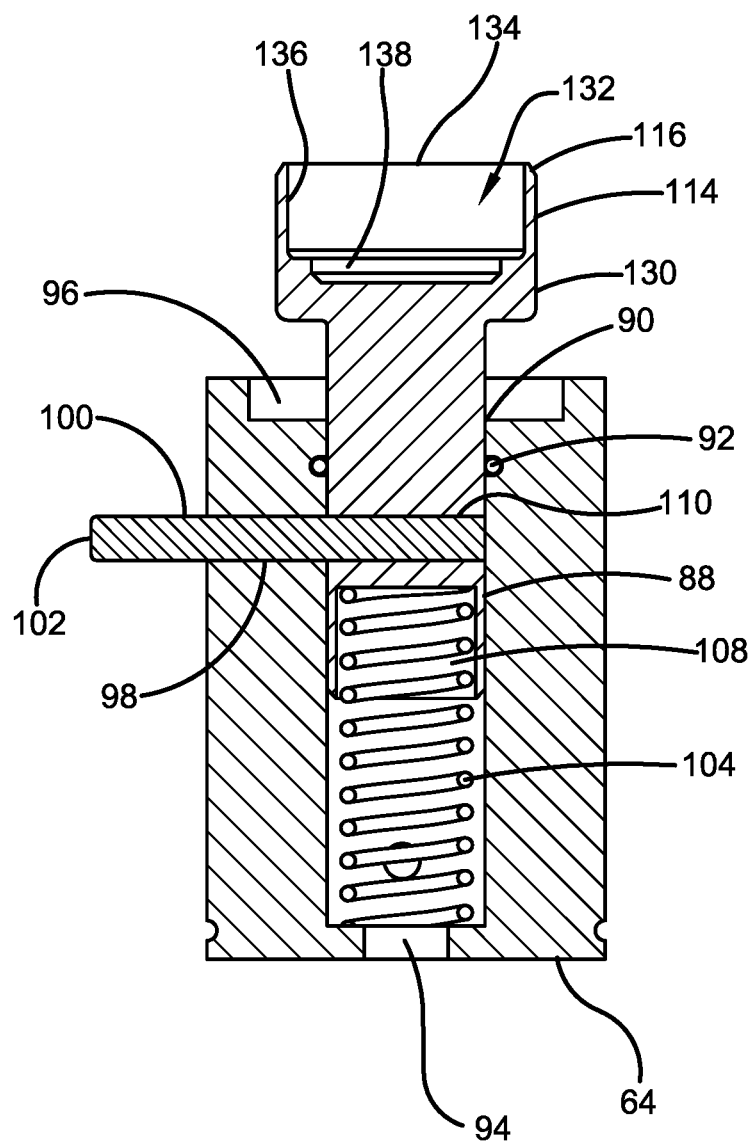
FIG. 15 is a axial cross-sectional view of an alternative exemplary set up tool with the seaming chuck gage held in a retracted position.

The exemplary can plug further includes a plug engagement aperture 98. The plug engagement aperture 98 extends radially from an outer surface of the can plug to the plug bore 88. In the exemplary arrangement the plug engagement aperture is axially disposed away from the plug reference surface of the can plug. The plug engagement aperture 98 is configured to accept a pin 100 therein in movable relation. As shown in FIG. 15 the exemplary pin is configured so that when the pin is fully extended in the pin engagement aperture a manually accessible outward portion 102 of the pin remains accessible to user. Of course this approach is exemplary and in other arrangements other approaches may be used.

The exemplary plug bore 88 is configured to house therein a compression spring 104. The spring 104 provides a biasing function later discussed between the seaming chuck gage and the can plug. Of course it should be understood that this biasing arrangement is exemplary and other arrangements other approaches and biasing members such as compressed gas springs may be used.

The exemplary seaming chuck gage 60 includes a stem 106. The exemplary stem has a cylindrical outside surface and has an outside stem diameter which enables it to be axially and rotationally movable in the plug bore 88. The exemplary plug bore in which the stem is movable, is cylindrical and has an inside bore diameter that is sufficiently large to enable the stem to be axially and rotationally movable therein. In the exemplary arrangement at least a portion of the inside bore diameter in the can plug is larger than the outside stem diameter by not greater than 0.003 inches. This close tolerance is maintained in the exemplary arrangement to minimize the amount of possible radial movement of the stem relative to the plug base and to help assure axial alignment. In the exemplary arrangement the resilient seal 92 extends radially intermediate of the outside stem surface and the bore inside surface. The resilient seal helps to avoid the introduction of contaminants into the plug bore which may impede stem movement and further helps to reduce relative radial movement of the can plug and the seaming chuck gage. Of course it should be understood that this configuration is exemplary and other arrangements other approaches may be used.

The exemplary stem further includes an axial recess 108 that extends in an inward end thereof. The exemplary axial recess 108 is configured to enable the spring 104 to extend therein in centered relation. This exemplary configuration helps to direct the spring force axially on the stem and to also minimize contact between the coils of the spring with the cylindrical wall of the bore. Of course this approach is exemplary and in other arrangements other approaches may be used.

The exemplary stem further includes a stem engagement aperture 110. The stem engagement aperture in the exemplary arrangement extends radially in the stem. The stem engagement aperture is configured to engage the pin 100 therein in releasable engagement. As represented in FIG. 15 the exemplary stem engagement aperture enables a radially inward portion of the pin to engage the stem engagement aperture 110 and hold the stem in a retracted position against the biasing force of the spring. As later explained this feature provides a selectively releasable catch that enables the seaming chuck gage to be held in an axially retracted position to facilitate installation of the tool into the can seamer machine. Of course it should be understood that this releasable catch configuration and approach of selectively holding the stem retracted is exemplary and in other arrangements other approaches may be used.

Figure 19:
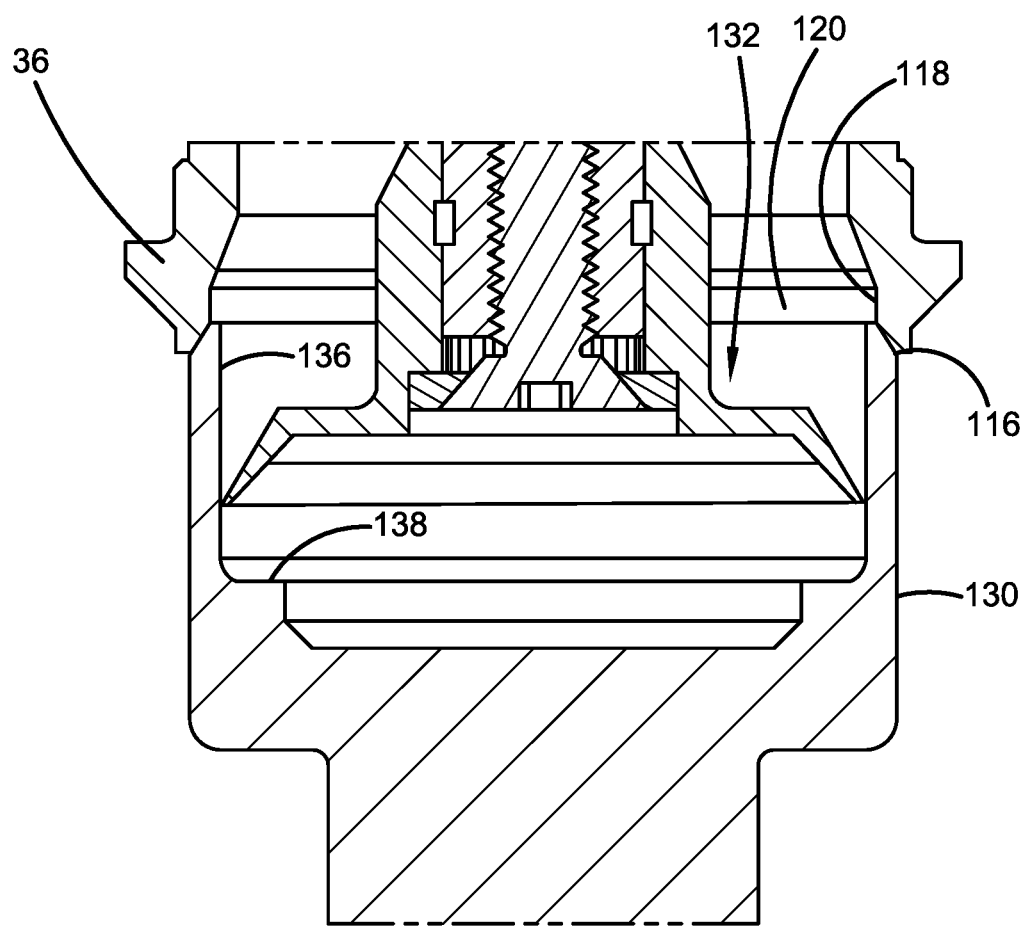
FIG. 19 is a cross-sectional view of the head of the seaming chuck gage in engagement with the seaming chuck and with a knockout pad positioned downward in the head recess.

The exemplary seaming chuck gage further includes a head 112. The head of the exemplary arrangement is generally cylindrical and is attached in axially centered relation to the stem 106. The exemplary head includes an axially centered annular head wall 114. The exemplary annular head wall includes an outer annular axially tapered head wall surface 116. The exemplary outer annular axially tapered head wall surface is configured to engage an annular vertically extending chuck surface 118 which bounds a recess 120 in the exemplary seaming chuck 36 as shown in FIG. 19. In the exemplary arrangement the outer annular axially tapered head wall surface 116 is configured to have a smaller diameter with increased axial distance away from the can plug. As a result the tapered surface 116 is configured to contact the annular vertically extending surface 118 of the seaming chuck so that the head is engaged in centered relation with the chuck 36 when the head is axially biased into engagement with the chuck by the spring 104.

Figure 20:
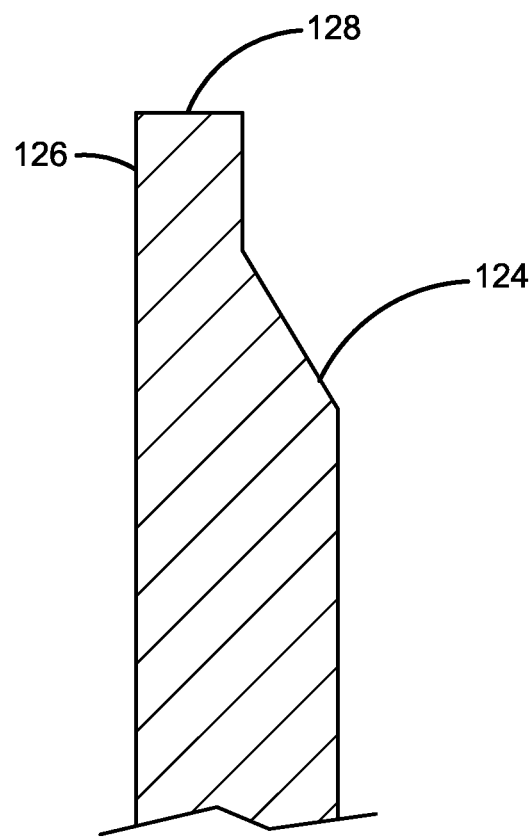
FIG. 20 is a cross-sectional view of an alternative configuration of an annular head wall.
Figure 21:
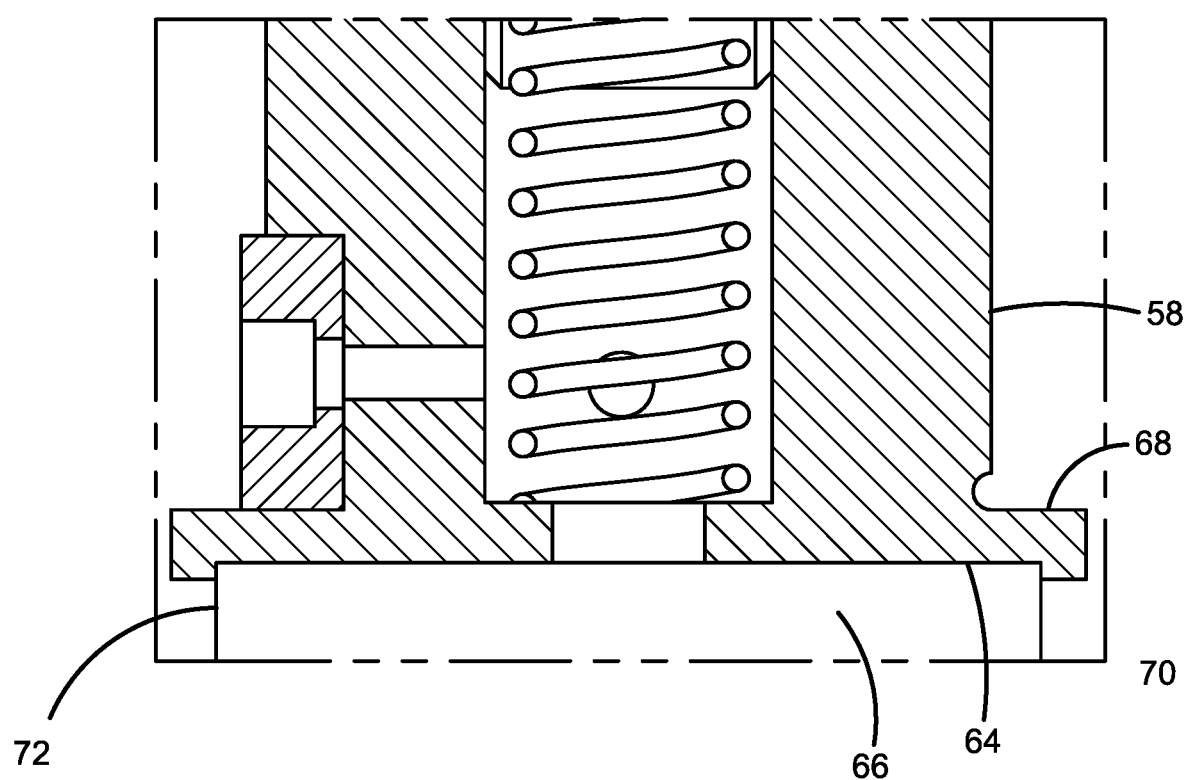
FIG. 21 is a cross-sectional view of an exemplary plug base of the set up tool in engagement with a lower chuck of the seaming machine.

Of course in other arrangements the tapered engaging surface of the head may have other configurations as may be appropriate to engage a seaming chuck that is of a different configuration. For example FIG. 20 shows one side an annular head wall 122 in axial cross-section. The exemplary alternative head wall includes an outer annular axially tapered head wall surface 124. The alternative configuration further includes a cylindrical annular head projection portion 126. The exemplary annular head projection portion extends parallel to the central axis of the tool in a direction away from the stem, and radially inwardly away from the outer axially tapered head wall surface.

The exemplary annular head projection portion terminates axially in an annular radially extending head top wall 128. In the alternative arrangement shown the cylindrical annular head projection portion may serve as a pilot portion to guide the head into centered relation in a chuck recess of the seaming chuck so that the outer annular axially tapered head wall surface 124 may engage with the annular vertically extending chuck surface of the seaming chuck. Further in his alternative arrangement the flat radially extending head top wall 128 may further assure that the head is in axially centered engagement with the seaming chuck by providing the user with a visual indication when the head projection portion 126 is not extending within the recess of the seaming chuck. Of course these approaches are exemplary and other arrangements other approaches may be used.

In the exemplary arrangement the annular head wall outer surface 130 that is disposed axially toward the stem from the tapered portion, is configured so that in the retracted position of the stem the head extends in the can plug recess 96 of the can plug. This exemplary configuration facilitates the ability of the tool to have a more compact axial length when the stem is in a retracted position. Of course it should be understood that this approach is exemplary and in other arrangements other approaches may be used.

The exemplary head further includes a head recess 132. Head recess 132 extends axially from a head recess opening 134. The exemplary head recess opening is bounded radially by an annular inner head wall surface 136. The exemplary head recess 132 is further bounded axially by a head recess floor 138.

In the exemplary arrangement the annular inner head wall surface 136 and the head recess opening 134 are sized such that in an operative position of the tool, a knockout pad that is axially centered in the seaming chuck 36 may extend axially into the head recess 132 while remaining disposed away from the inner head wall surface as shown in FIG. 19. Further the knockout pad in its maximum downward position at the makeup angular position, is disposed upward and away from the head recess floor 138. As a result the head 112 is enabled to engage the seaming chuck with the knockout pad disposed in its downward position without the knockout pad causing interference with the positioning of the head and the seaming chuck gage. Of course it should be understood that this configuration and arrangement is exemplary and in other arrangements other approaches may be used.

Figure 16:
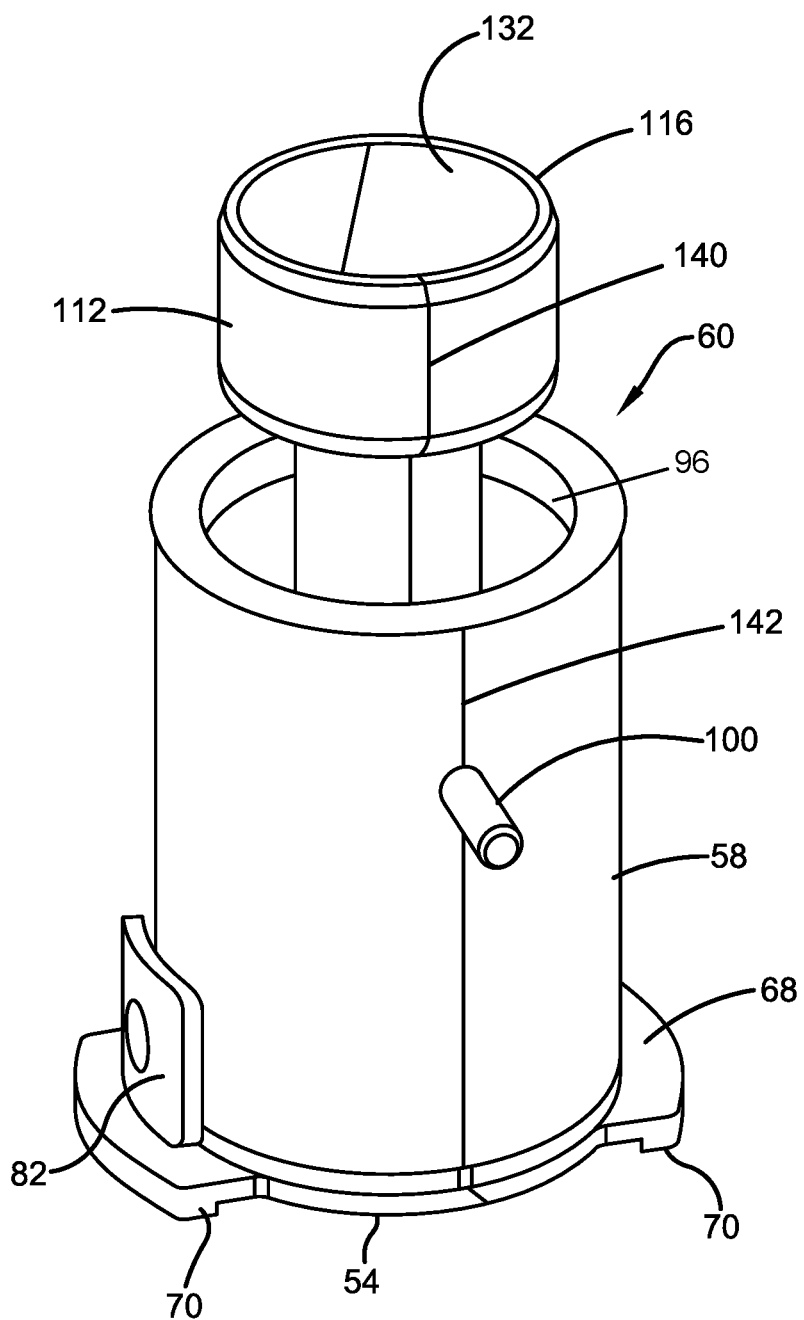
FIG. 16 is a top perspective view of the alternative set up tool with the seaming chuck gage in the retracted position.

Further in exemplary arrangements the tool may include features to facilitate the use of the tool. For example the head may include a visible indicator mark such as mark 140 shown in FIG. 16, which is indicative of the location of the stem engagement aperture 110 in the stem. Such a visible mark enables the user to more readily rotationally position the stem to be in aligned relation with the plug engagement aperture 98 so that the pin 100 can be inserted into the stem engagement aperture. Further exemplary arrangements may include an alignment marking 142 on the can plug to further facilitate the alignment of the stem aperture and engagement of the pin.

The alternative arrangement of the seaming chuck gage shown in FIGS. 7-10 shows an alternative head mark 144. The head mark 144 is positioned to indicate to a user the position of the stem engagement aperture 110. An additional feature of the head of the seaming chuck gage shown in FIGS. 7-10 is an annular roughened manual grip surface 146. Grip surface 146 extends on the head wall outer surface axially intermediate of the outer annular axially tapered head wall surface 116 and the stem. In the exemplary arrangement the roughened manual grip surface comprises a knurled surface that facilitates manual engagement of the head. The roughened surface helps the user to maintain a firm grip on the head particularly when the pin 100 is moved to disengage the stem, and the head is biased by the spring to move axially outward from the can plug. The ability of the user to firmly grip and control the movement of the head helps to assure that the head does not crash into the seaming chuck or other structures and cause damage thereto. Further as shown in FIG. 10 exemplary arrangements may include visual indicia indicative of the particular type of lid with which the seaming chuck gage is configured to be used. Such indicia may be included on the head recess or in another suitable location to indicate to a user the lid type and/or the size of lid with which the seaming chuck gage is configured to be utilized. Of course it should be understood that this approach is exemplary and in other arrangements other approaches may be used.

In an exemplary arrangement the set up tool 56 may be used to measure, orient, set and verify tolerances and dimensions of components of the can seamer machine 10 at the makeup rotational position 34 of the seaming turret 18 at which the lid feed turret 12 delivers the lid. In the exemplary arrangement access to the seaming chuck and other components of the machine at the makeup rotational position 34 is limited. This is due to a large number of mechanisms that extend adjacent to the makeup location. In the exemplary arrangement and in a method of use of tool 56, the tool is initially configured with the seaming chuck gage 60 in the retracted position. This is done via the manually releasable catch, which in the exemplary arrangement is achieved through engagement of the pin 100 with the stem engagement aperture 110 of the stem 106.

Further prior to the use of the exemplary tool 56, a user is enabled to verify that the seaming chuck gage 60 and can plug 58 correspond to the particular can configuration and lid that is processed through operation of the machine. This may be done for example by reviewing indicia that is included on the components of the tool and/or through measurement of the cans and lids that are processed through operation of the machine. Of course as previously discussed, in the exemplary arrangement the components of the tool are configured to have a corresponding relationship to dimensions of the cans and lids that are processed through operation of the machine, and in some arrangements to have dimensions that correspond to extremes of can configurations that may be within the specifications for cans and lids of the particular type that are processed by the machine. This helps to assure that the machine set up will work with cans and lids that may not be close to the middle of the range of acceptable dimensions for the particular can and lid types. Of course this approach is exemplary and in other arrangements other approaches may be used.

In the method of use of the exemplary tool 56, the tool is initially positioned in engagement with the lower chuck corresponding to a pocket of the can seaming turret 18 that is disposed downstream from the makeup rotational position. By downstream it is meant that the particular pocket is in a location that during machine operation, a can is positioned in after the can has been in the makeup position. In the exemplary machine such a pocket is much more accessible externally than when that pocket is at the makeup position.

Figure 17:
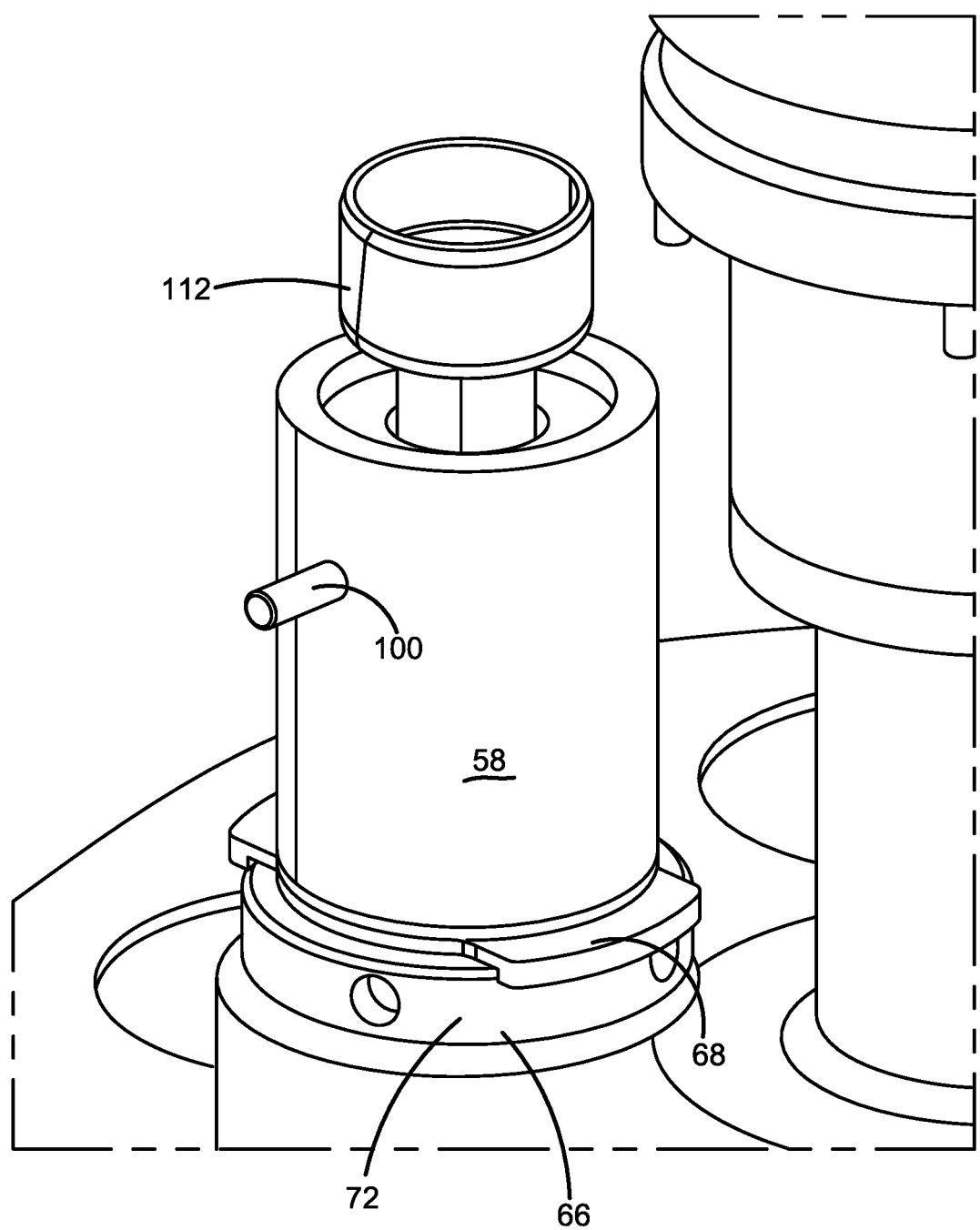
FIG. 17 is a top perspective view of the set up tool shown in engagement with a lower chuck of a can seamer machine.
Figure 18:
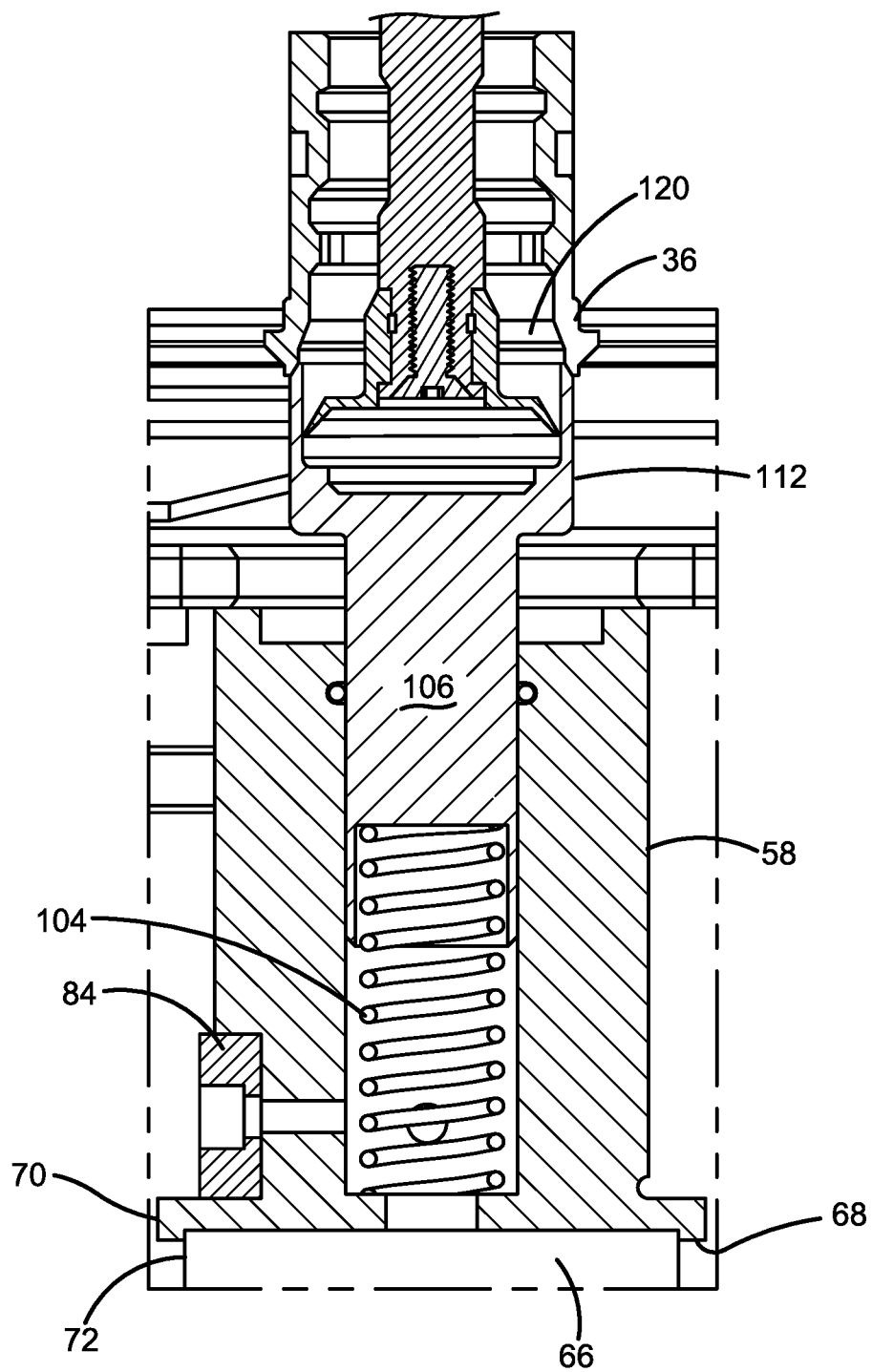
FIG. 18 is a cross-sectional view of the set up tool in engagement with a seaming chuck and the lower chuck of a can seamer machine.

In an exemplary method arrangement, the plug base 64 of the can plug 58 is positioned in engaged relation with a lower chuck 66 as represented in FIG. 17. The exemplary can plug is positioned so that the feet 68 and the axially extending projections 70 thereon, are engaged with the peripheral surface 72 of the lower chuck 66. Such engagement positions the tool in axially centered relation with the lower chuck, but still enables relative rotational movement of the can plug 58 and the chuck 66 about the common vertical axis.

In the exemplary process of using the tool, after placement of the tool in the pocket downstream from the makeup rotational position, the pin 100 which holds the stem initially in the retracted position is released while the head 112 is engaged and guided manually into the recess 120 of the seaming chuck 36. The ability of air to enter the plug bore through a vent opening such as opening 94, enables the stem 106 to readily move axially responsive to the biasing force of the spring 104. The spring 104 causes the head 112 to be biased into centered engagement with the seaming chuck. This is facilitated by the engagement of the tapered head wall surface 116 or 124 with the annular vertically extending surface of the chuck as previously discussed in connection with FIGS. 19 and 20.

In the exemplary method of use of the tool, the technician user next manually or otherwise controlled causes controlled movement of the machine components in a direction opposite to that in which the components move during normal machine operation. This is accomplished through manual movement of a handwheel or other suitable machine drive schematically represented 148 that can be controlled to carefully enable movement of the machine components in the opposed direction. In the exemplary arrangement such movement by the set up technician causes the can seaming turret 18 to move in a clockwise direction as shown in FIGS. 1 and 2.

In an exemplary method of use, the set up technician operates the machine to position the tool and the pocket in which the tool is positioned, at a rotational position of the can seaming turret that is somewhat backed up beyond (in other words, ahead of) the makeup rotational position. This is done in the exemplary arrangement so that the technician can thereafter manually cause machine component movement in the normal production direction, thus taking up any slack or lash that may exist in gears or other drive connections in the machine.

In the exemplary arrangement the set up technician is enabled to observe the position of the tool as it is moved in the back up, reverse direction to beyond the makeup rotational position. In exemplary arrangements the technician may manually rotate the can plug 58 relative to the lower chuck, such that the outer recess surface is rotatably positioned in immediately adjacent facing relation with a guide rail of the machine that extends adjacent to the turret pocket in the makeup position. Thus for example as represented in FIG. 1, the outer recess surface 78 may be positioned so that the recess is in immediately adjacent facing relation with the guide rail 150, and the tool does not enter into engagement with the guide rail 150 when the tool is backed up to beyond the makeup rotational position. Of course it should be understood that this arrangement is exemplary, and in other arrangements other types of obstructions and components within the machine may be avoided during use of the tool through the positioning of recess surfaces on the periphery of the can plug 58.

In the exemplary arrangement after the setup technician has moved the machine in the reverse direction to back up the tool in the pocket on the can seaming turret beyond the makeup rotational position, and then moved the machine in the operational direction so that the tool is at the makeup rotational position, a number of set up activities that are appropriate for the particular type of machine may be conducted.

Figure 22:
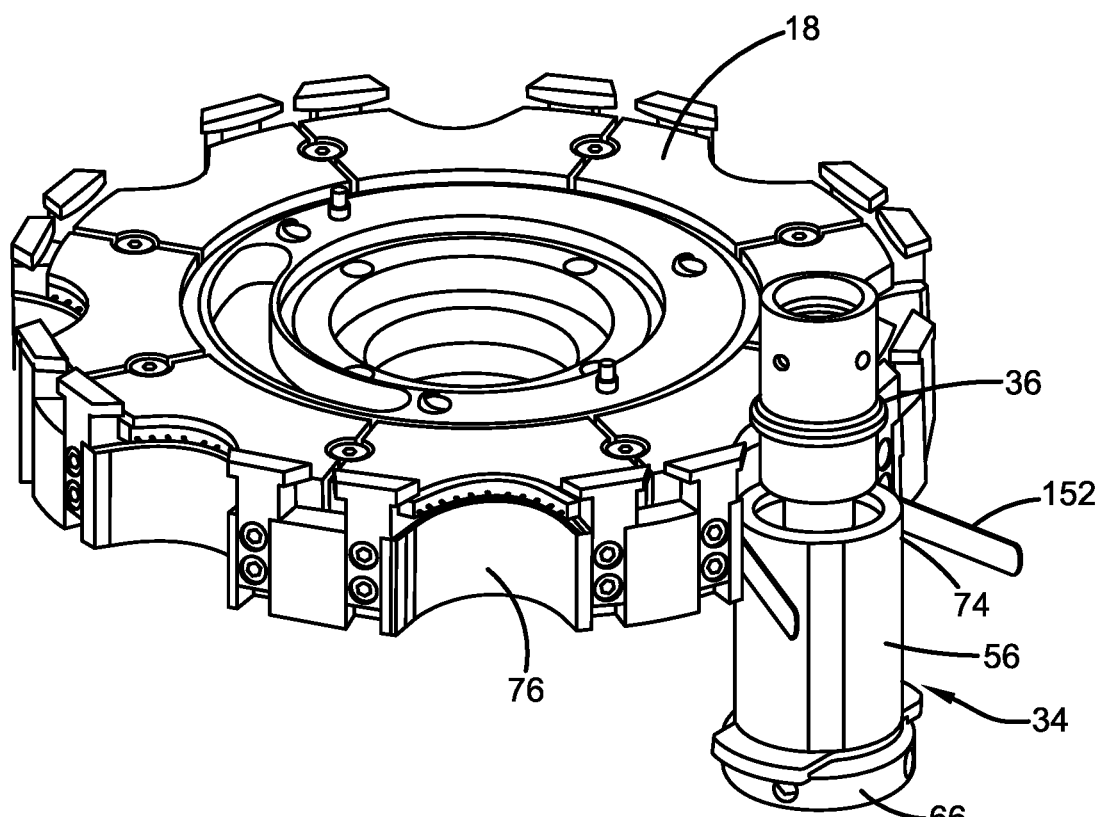
FIG. 22 is a top perspective view of the exemplary set up tool positioned in a turret pocket of a can seamer turret in a makeup rotational position, including a feeler gauge extending between the semicircular turret pocket surface and the plug reference surface of the can plug.

For example as represented in FIG. 22, a technician may verify and/or achieve angular alignment of the can seaming turret 18 with the axis of the seaming chuck and the lower chuck. In an exemplary arrangement this is accomplished by loosening mounting bolts that enable the seaming turret 18 to rotationally move relative to a mounting base. The exemplary can feed turret can be appropriately angularly positioned by placing a flexible feeler gage 152 in engagement with the plug reference surface 74 of the can plug. In an exemplary approach the flexible feeler gage 152 is extended about the plug reference surface 74 such that the feeler gage extends radially between the semicircular turret pocket surface 76 and the plug reference surface throughout the entire turret pocket surface. Positioning the feeler gage 152 in this manner causes a desired distance, which corresponds to the thickness of the feeler gage, to extend between the cylindrical plug reference surface and throughout the entire semicircular turret pocket surface. By positioning the feeler gage in this manner the seaming turret 18 is placed in the proper angularly aligned position with the axis of the tool 56, and thus the axis of the seaming chuck and the lower chuck. The technician then tightens the mounting bolts fastening the seaming turret to the mounting base in this position. This will cause the seaming turret to be set in fixed angular alignment with the seaming chuck and lower chuck.

In some methods a technician may initially verify the desired distance between the cylindrical plug reference surface and the semicircular turret pocket surface by extending a flexible feeler gauge having a thickness corresponding to the desired distance, between the plug reference surface and the semicircular turret pocket surface. If the flexible feeler gage which is of uniform thickness, is not enabled to be extended between the entire plug reference surface and the turret pocket surface, it will be indicative of misalignment and the need to make in angular adjustment. Alternatively or in addition, after setting the angular alignment of the seaming turret, the technician may verify that the turret is in the proper position by extending a feeler gage of a desired uniform thickness between the plug reference surface and the semicircular turret pocket surface.

Of course the approach shown and discussed of using a flexible feeler gauge to set the distance between the plug reference surface of the tool and the semicircular pocket surface is exemplary. In other arrangements alternative types of gap measuring devices may be utilized for purposes of determining or verifying a gap distance between such surfaces. For example thin capacitive noncontact displacement sensors may be positioned between the surfaces to determine the distance between the plug reference surface and the turret pocket surface. Alternatively spring contact type gap sensors may be positioned between the surfaces for purposes of measuring the distance in discrete locations or throughout the semicircular space. In some arrangements such sensors may be placed in various locations between the surfaces for detecting the distance at various angular and/or axial locations. Examples of such thin capacitive gap sensors and spring contact gap sensors that may be utilized for this purpose are commercially available from Capacitec, Inc. as well as other suppliers.

Further in other exemplary arrangements thin capacitive thickness sensors or other types of thickness sensors may be mounted in operative connection with the can plug. In some exemplary arrangements the sensors may be in operative connection with circuitry mounted on the tool which includes a wireless transmitter. Such a wireless transmitter may be utilized for purposes of wirelessly transmitting measurement data from the sensors to a nearby wireless device. Such a wireless device may receive, record, display and/or analyze measurement data to output and/or determine the relationship of such measurement data to certain stored threshold distance values or other stored ranges or values. Of course these approaches are exemplary and in other arrangements other approaches may be used.

Figure 23:
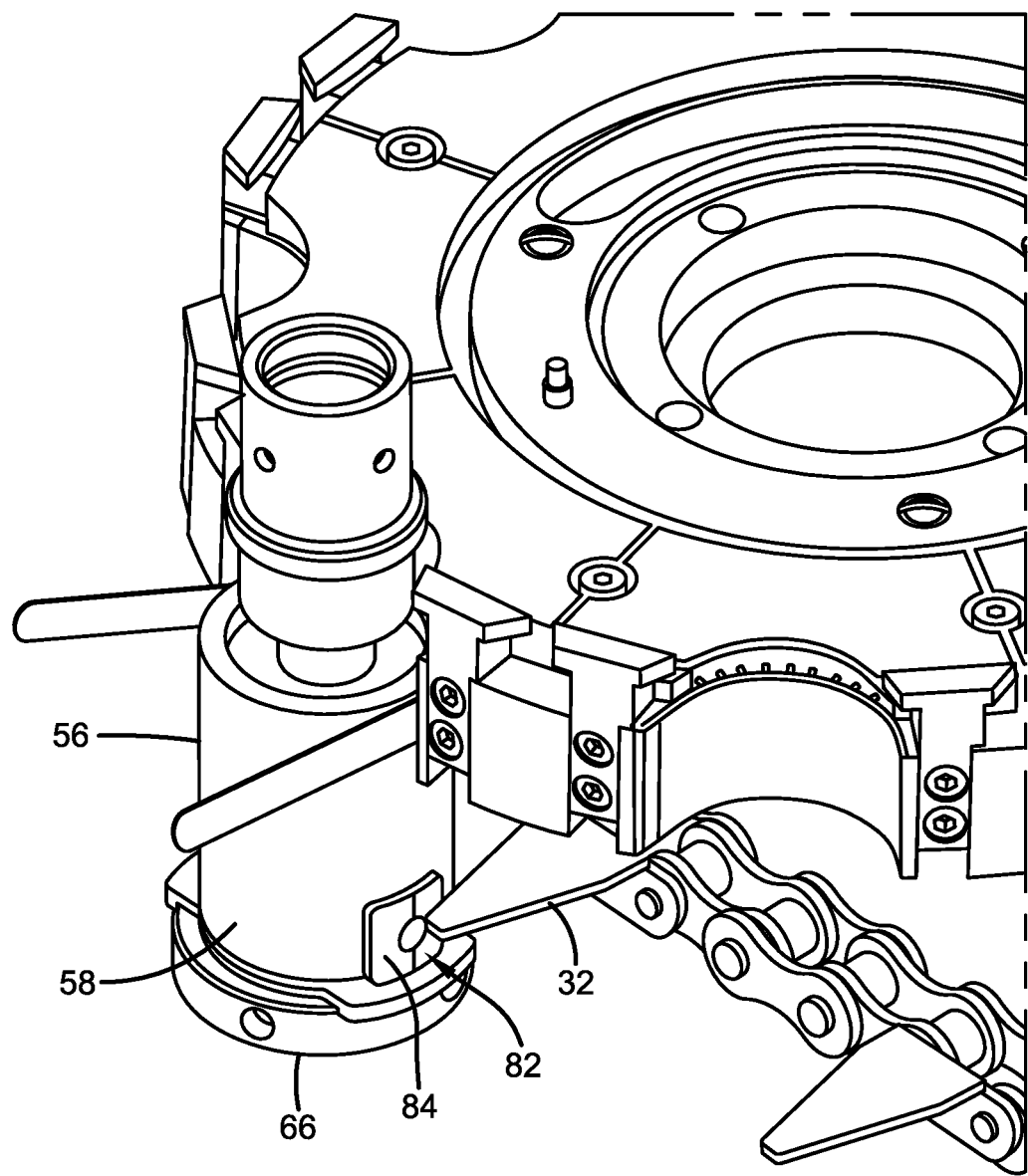
FIG. 23 is a top perspective view of the exemplary set up tool positioned in the turret pocket and a can engaging projection of a feed chain adjacent to a chain timing projection of the set up tool.

FIG. 23 shows a further exemplary operation that may be performed by a technician to set up the can seamer machine using the exemplary tool 56 positioned at the makeup angular position 34 of the pocket of the can seaming turret. The technician is enabled to position the circumferential portion of the can plug 58 that includes the chain timing projection 84 in immediate adjacent facing relation with the can engaging surface of the adjacent can engaging projection 32 of the can feed chain. As can be appreciated the projections 32 of the can feed chain moves cans into engagement with the pockets of the seaming turret 18. As the can engages the pocket at the makeup position, the turret engages the can and moves it away from the surface of the can engaging projection 32.

In the exemplary arrangement the distance that the outer reference surface 82 on the chain timing projection on the can plug extends outward from the axis of the tool corresponds to a chain dimensional tolerance that the leading can engaging surface of the can engaging projection must be disposed from the axis of the tool (and the axis of the seaming chuck and lower chuck) in order to avoid damage to a can during machine operation. In the set up of the exemplary machine, the technician is enabled to loosen the chain drive of the feed chain and to adjust the chain such that the can engaging surface at the leading edge of the can engaging projection 32 is aligned flush with the reference surface 82 of the projection. The technician may then lock the chain drive in the desired orientation. Setting the feed chain in this manner assures that the proper chain tolerance is set and verified. Of course it should be understood that the ability in the exemplary arrangement to attach the corresponding chain timing insert projection 84 in fixed operative connection with the can plug within the insert recess 86 assures that the proper chain tolerance for the particular type of seamer machine and can size is set. Of course this approach of using the tool to set the chain tolerance for a can feed chain is exemplary and in other arrangements other approaches may be used.

Figure 25:
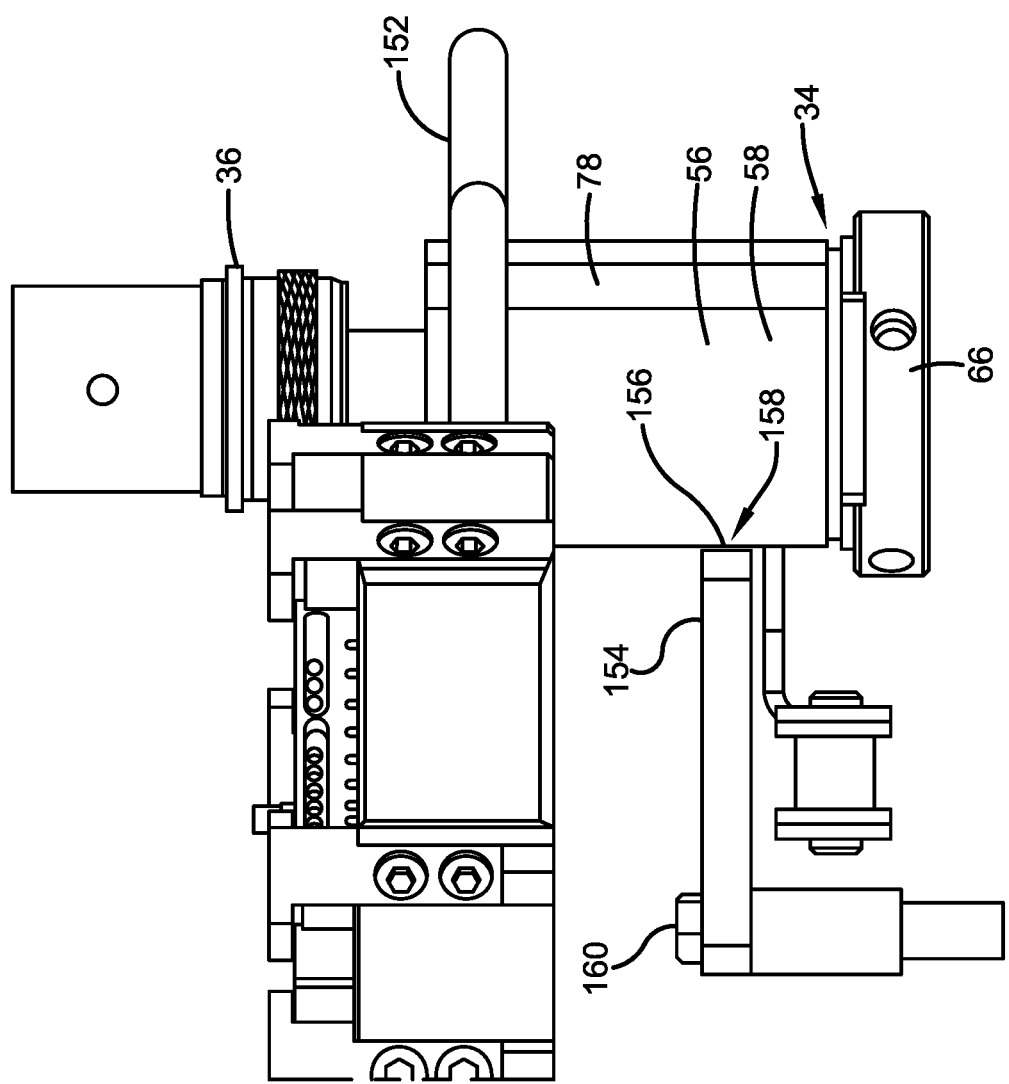
FIG. 25 is a side view of the set up tool positioned in the turret pocket and the can feed inlet rail.

FIG. 25 shows a side view of the set up tool 56 in the makeup position 34. The exemplary machine includes a can feed inlet rail 154. The can feed inlet rail includes a can engaging surface 156 that is in immediate adjacent facing relation with cans during production operation of the machine. The engaging surface 156 of the can feed inlet rail stabilizes the can and acts as an extension of the back of the can turret pocket during machine operation. The engaging surface 156 needs to be positioned properly within the machine. Otherwise, cans may travel too deep into the turret pocket and be damaged.

In the exemplary method of use of the set up tool 56, a semicircular reference surface 158 on the can plug extends a set uniform distance from the central axis of the tool. A technician performing set up activities is enabled to check for a proper contacting relationship between the engaging surface 156 of the can feed inlet rail 154 and the reference surface 158 on the adjacent can plug 58. Such a contacting relationship may correspond to touching contact without interference or axially transverse force on the can plug. Checking for the proper contacting relationship may be accomplished by visually inspecting for a contacting relationship (or the lack of a visually detectable gap), or by using other methods such as attempting to insert a feeler gauge or other measuring device in a manner like that previously discussed to assure that there is a contacting relationship between surfaces 156 and 158, and/or less than a set gap therebetween.

Alternatively or in addition in the exemplary set up method the technician may set the proper contacting relationship between the reference surface 158 and the engaging surface 156 by loosening fasteners such as fastener 160, which during operation of the machine, holds the can feed inlet rail 154 in a fixed position. Loosening the fasteners associated with the can feed inlet rail 154 enables the technician to move the rail so that it is in the proper contacting relation with the reference surface 158. The technician may then tighten the fasteners 160 so that the can feed inlet rail 154 is in the proper position.

In the configuration of the exemplary tool 56, the reference surface 158 used for setting the position of the inlet rail 154 is uniformly disposed from the central axis of the tool at an axial distance upwardly away from the plug base 64, except in the area of the outer recess surface 78. Thus in the exemplary arrangement the angular orientation of the can plug relative to the engaging surface 156 is enabled to be anywhere other than in the area of the recess surface 78 when setting proper contacting engagement with the feed inlet rail. However in other arrangements, specific reference surface areas on the exterior of the can plug for setting contacting engagement with the inlet rail may be specified such that the technician can rotationally position the can plug so that the reference surface is in immediate adjacent facing relation with the engaging surface of the feed inlet rail for purposes of positioning the feed inlet rail. Of course it should be understood that these approaches and tool configurations are exemplary and in other arrangements other approaches may be used.

Figure 26:
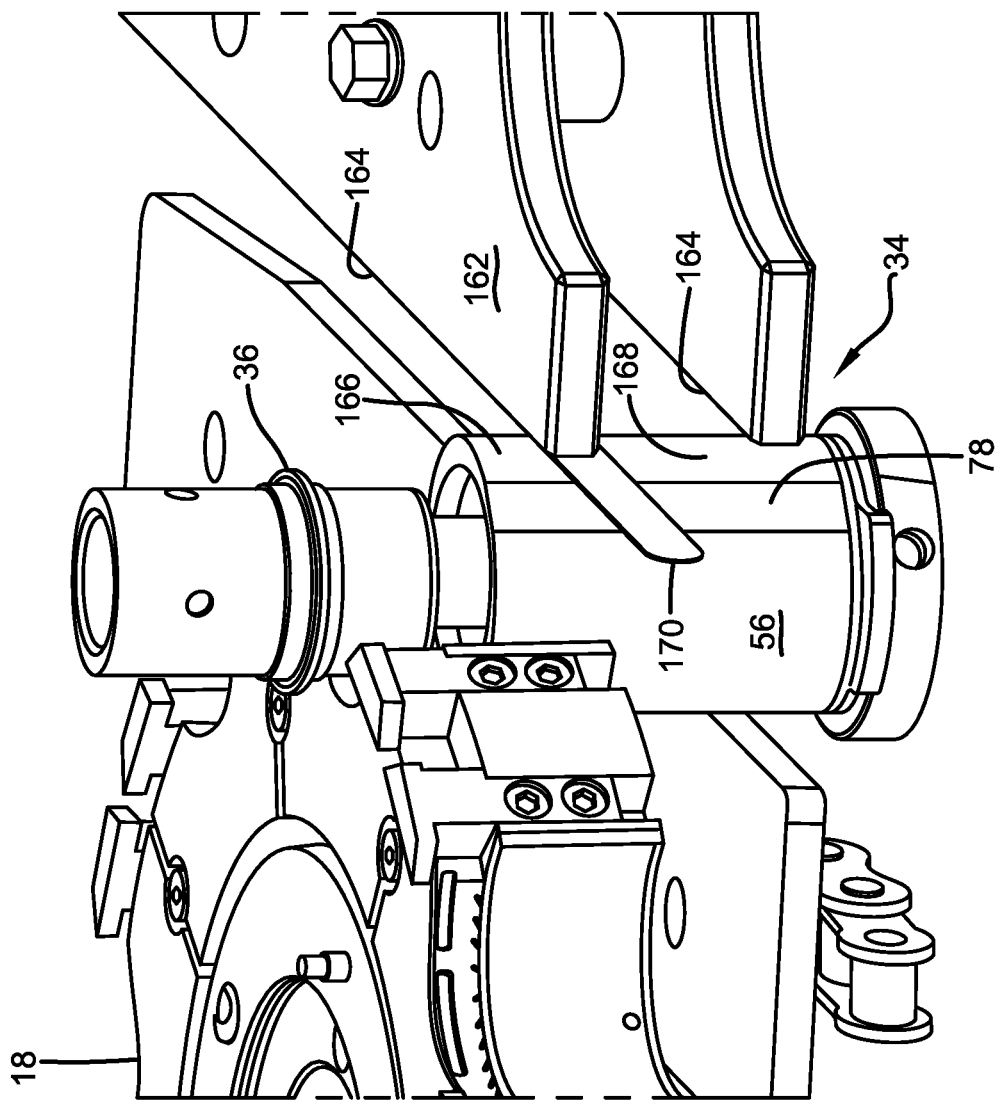
FIG. 26 is a top perspective view of the exemplary set up tool positioned in the turret pocket and a stationary guide adjacent to the can plug of the tool, with a feeler gauge positioned between the outer surface of the can plug and the stationary guide.
Figure 27:
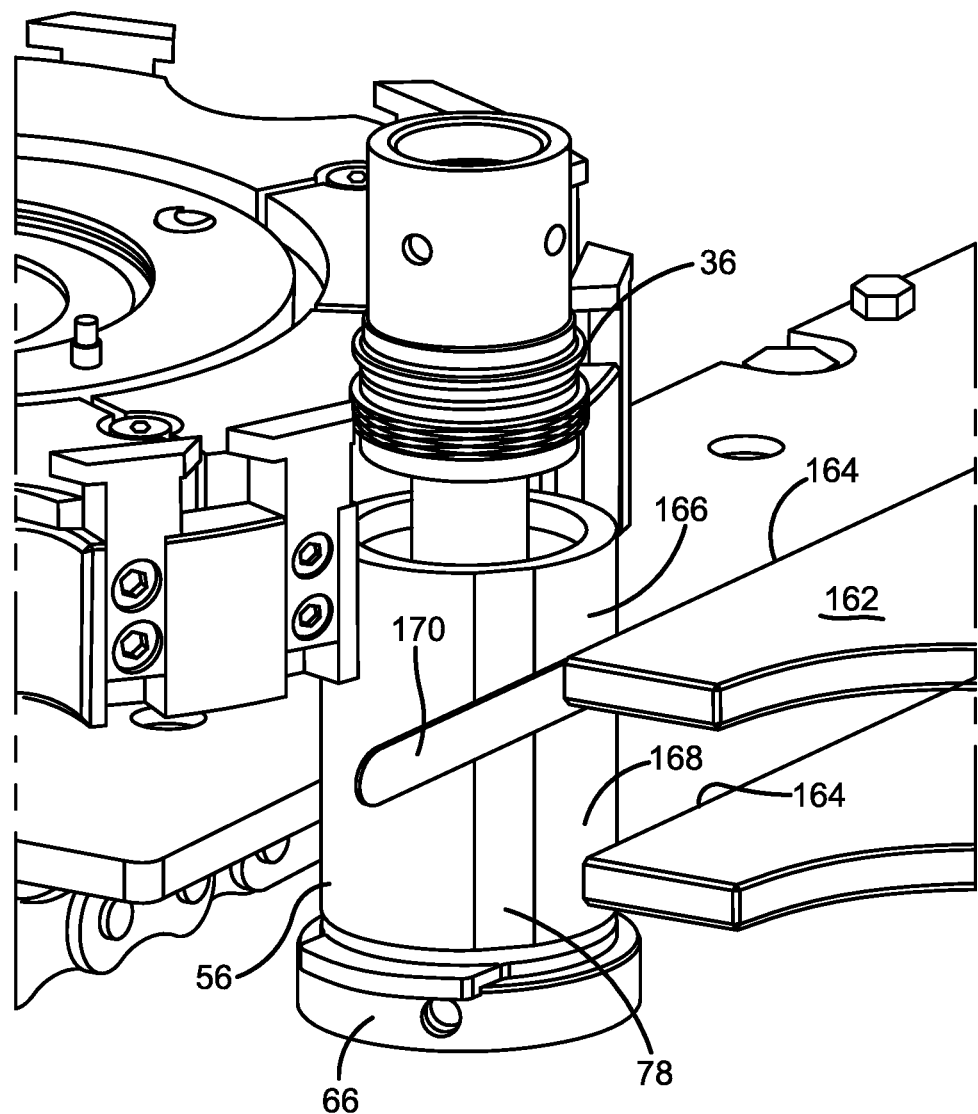
FIG. 27 is a further view of the exemplary set up tool positioned in the turret pocket and adjacent to the stationary guide.

FIGS. 26 and 27 show other views of the set up tool 56 at the makeup rotational position 34. FIG. 26 shows a guide 162 that is used during machine operation for stabilizing radially outward circumferential surfaces of cans as they are guided into engagement with the can seaming turret 18. The exemplary guide 162 includes engaging guide surfaces 164. In the exemplary arrangement the outer surface of the can plug 58 of the tool 56 includes a pair of axially disposed reference surfaces 166, 168. In the exemplary arrangement the reference surfaces 166 and 168 are disposed at selected axial distances from the plug base so as to be in immediate adjacent facing relation with the respective guide surfaces 164, and disposed radially outward from the axis of the tool a set distance. The set distance has a corresponding relationship to an outer circumferential surface of cans that are processed through operation of the machine at the horizontal level of the guide surfaces 164.

In the exemplary set up process a technician is enabled to verify a proper distance between the respective reference surfaces 166 and 168 and the immediately adjacent engaging guide surfaces 164. This can be done by extending a feeler gauge 170 or positioning another other type of gap measuring device to measure between the reference surfaces and engaging guide surfaces. In the exemplary arrangement the feeler gauge enables verification that a proper distance extends between the reference surfaces and the engaging guide surfaces. Further, in the event that the distance between the guide surfaces and the reference surfaces are not within the desired range, the technician is enabled to make the guide relatively movable with respect to other components of the machine and position the guide such that the guide surfaces and reference surfaces are spaced apart the specified appropriate distance. Of course this approach is exemplary and in other arrangements other approaches may be used.

Again with regard to the exemplary set up tool 56 the reference surfaces 166 and 168 extend at a uniform radial distance outward from the axis of the tool at the horizontal level of the engaging guide surfaces other than in the area of the outer recess surface 78. However in other tool arrangements specific circumferential areas on the outer surface of the can plug may be provided for purposes of including a reference surface for setting the distance between the guide surfaces and reference surfaces. During set up such specific areas may be placed in immediately adjacent facing relation with the corresponding engaging guide surfaces by rotational movement of the plug base relative to the lower chuck and the stem. Further in some alternative exemplary arrangements electronic distance sensors may be provided on the tool for determining the distance from a reference point or points to engaging guide surfaces in selected areas. Wirelessly transmitting such distance data from circuitry in the tool in connection with the sensors via Bluetooth or NFC for example, to a nearby wireless signal receiving device may further facilitate verifying that distances are within tolerance and positioning guides or other components in the proper locations.

In exemplary arrangements a technician may need to verify the positions of other components in the machine other than those exemplary machine components that have been mentioned herein. The technician may do so in a manner like that discussed with the set up tool 56 at the makeup rotational position, or alternatively at other appropriate rotational positions of the seaming turret 18.

After the technician has completed the appropriate set up activities, the technician may then move the seaming turret in the operational rotational direction such that the pocket holding the tool 56 is accessible to the technician from outside the machine. The technician may then manually grasp the head of the seaming chuck gage and move it to the retracted position so as to disengage from the seaming chuck. The technician may reengage the catch to hold the head in the retracted position. This is done in the exemplary arrangement by reinstalling the pin in the plug engagement aperture and engaging the pin and the stem engagement aperture to hold the stem in the retracted position. The technician may then axially move the tool 56 upward to disengage the plug base from the lower chuck. After completing these activities the technician may then take the appropriate steps to operate the machine, begin to run test cans or otherwise begin the process of returning the can seamer machine into service.

It should be mentioned that in the exemplary arrangement of the method of use of the tool with the particular type of machine, it is only necessary for the technician to conduct the set up activities at the makeup angular position of only one turret pocket. This is because in the exemplary arrangement each of the turret pockets have a fixed angular and dimensional relationship to all of the other turret pockets and do not require that each individual pocket undergo a set up procedure. However in other arrangements a set up tool having one or more of the features described herein may be utilized to conduct set up activities for multiple pockets of a machine if necessary.

Further while in the exemplary arrangement the set up activities are all conducted in the makeup rotational position, in other arrangements set up activities may be conducted in other rotational positions of the seaming turret. This may include for example positioning can guides, or other can engaging components of the machine that may be positioned in other areas of the seamer machine. Because in the exemplary arrangement the set up tool has dimensions that have a corresponding relationship to cans that are processed through operation of the machine, exemplary set up tools may be utilized in numerous different locations for purposes of verifying and positioning components which are configured to engage cans during machine operations and/or are required to be a predetermined distance away from cans during machine operations. Of course these approaches are exemplary and in other arrangements other approaches may be used.

Figure 28:
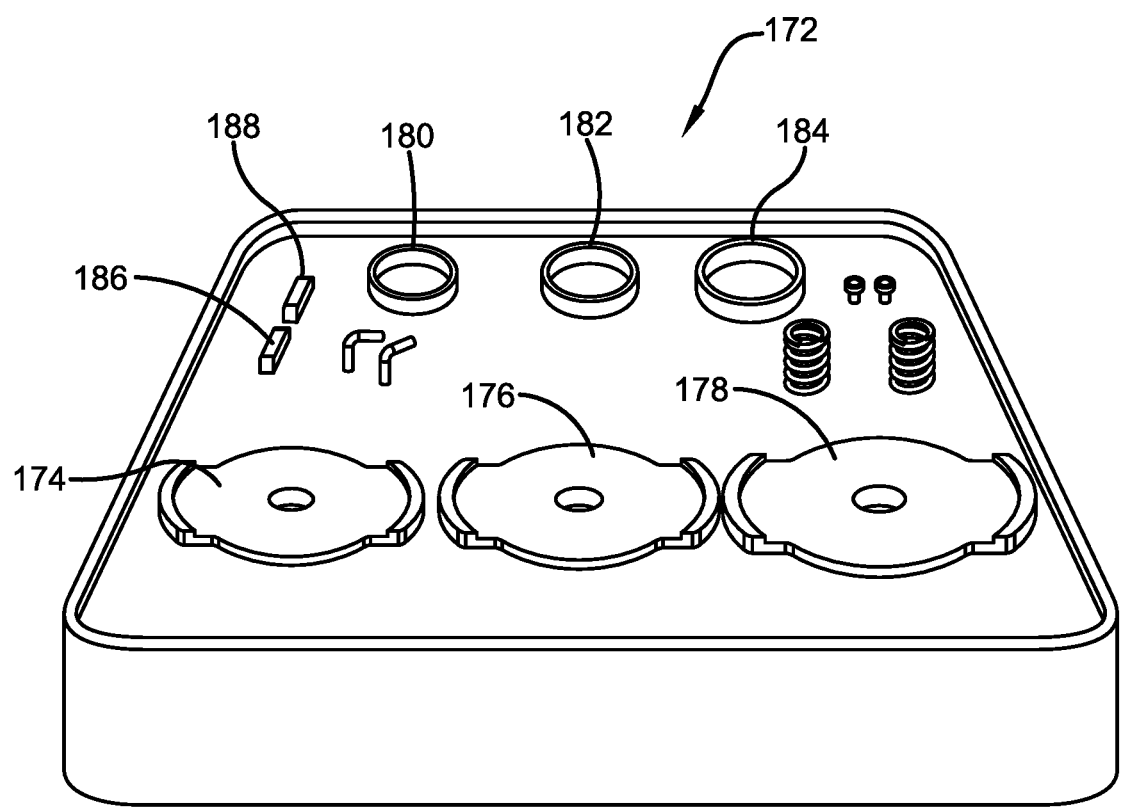
FIG. 28 is a top front perspective view of a kit including a plurality of seaming chuck gages configured for engaging different sizes and types of can lids, and a plurality of cylindrical can plugs corresponding to different outside can diameters, a plurality of chain timing inserts and other tool components usable to enable the set up of a plurality of different can seamer machines.

In some exemplary arrangements a plurality of set up tool components may be organized into a kit 172 an example of which is shown in FIG. 28. The exemplary kit may be utilized by a technician to conduct set up activities for numerous different types of can seamer machines, as well as can seamer machines of the same type that may be configured to carry out different process activities.

In the exemplary arrangement the kit 172 includes a plurality of can plugs 174, 176 and 178. The exemplary can plugs may have features similar to the can plug previously described, but may have different dimensions that have a corresponding relationship to different respective types of can bodies. Of course as can be appreciated exemplary kits may include different numbers of can plugs.

Further the exemplary kit 172 includes a plurality of seaming chuck gages 180, 182 and 184. The seaming chuck gages may have features like the seaming chuck gage previously described but may correspond to respective different style types and/or sizes of can lids. Of course different numbers of seaming chuck gages may be included in a given kit. In exemplary arrangements the respective stems of the seaming chuck gages and the plug bores of the can plugs may be correspondingly sized so that each seaming chuck gage may be used with a plurality of different can plugs. This capability enables set up of machines that process and close different sizes and types of can bodies and do so using different styles and sizes of lids.

The exemplary kit further includes a plurality of chain timing projection inserts 186, 188. The chain timing projection inserts may correspond to different types of can seamer machines, such as ones which handle different can sizes, so as to enable the technician to set up the can feed chains as appropriate for the particular machine type and can type being processed. Of course kits may include different numbers and types of chain timing projection inserts.

The exemplary kit may further include other components associated with the use of the exemplary set up tool. These components may include for example, different pins, springs, fasteners, wrenches or other items that are used in the operation of the set up tool. Further exemplary arrangements may include measuring devices such as feeler gauges, electronic gap sensing devices or other devices that are usable to determine distances or other relationships or properties that are required to be measured or set during set up activities. Further in exemplary arrangements that may include tools with built-in electronic sensors, exemplary kits may include devices associated with wirelessly transmitting, receiving and analyzing signals that correspond to orientation, distance and/or dimensional information like that previously discussed. Of course it should be understood that these components are exemplary and in other arrangements other or different components may be used.

The exemplary kit may include a suitable carrying case and compartmental material to facilitate holding and selecting tool components. In the exemplary arrangement shown, a formed foam material may be utilized for purposes of providing engaging recesses that are sized for accepting the different tool components. Further exemplary kits may include compartments, pockets or other suitable enclosures for housing the items which comprise the particular kit. Visible indicia may also be provided on tool components and holding compartments and/or pockets to identify particular tool components.

Thus the exemplary arrangements described herein achieve improved operation, eliminate difficulties encountered in the use of prior devices, systems and methods, and achieve the useful results described herein.

In the foregoing description certain terms have been used for brevity, clarity and understanding. However no unnecessary limitations are to be implied therefrom because such terms are used for descriptive purposes and are intended to be broadly construed. Moreover the descriptions and illustrations herein are by way of examples and the inventive features are not limited to the exact features and details that have been shown and described.

Further in the following claims any feature described as a means for performing a function shall be construed as encompassing any means known to those skilled in the art as being capable of carrying out the recited function, and shall not be deemed limited to only the particular means shown or described for performing the recited function in the foregoing description, or mere equivalents thereof.

It should further be understood that the features and/or relationships associated with one device arrangement or method of operation, can be combined with features and/or relationships from another device arrangement or method of operation. That is, various features, relationships or steps from various arrangements or methods can be combined in further arrangements. The inventive scope of the disclosure is not limited only to the particular arrangements that have been shown and described.

Having described features, discoveries and principles of the exemplary arrangements, the manner in which they are constructed, operated and utilized, and the advantages and useful results attained, the new and useful structures, devices, elements, arrangements, parts, combinations, systems, equipment, operations, methods, processes and relationships are set forth in the appended claims.

What is claimed is:
1. Apparatus comprising:
 a set up tool for a can seamer machine, including
  a generally cylindrical can plug, wherein the can plug extends along an axis and includes
   a plug base, wherein the plug base is configured to engage a lower chuck of the machine in axially centered supported relation,
   a generally cylindrical plug reference surface, wherein the plug reference surface
    is uniformly axially disposed from the plug base an axial distance that corresponds to a semicircular turret pocket surface that bounds an interior area of a turret pocket of a turret of the machine,
    has a uniform diameter about at least half of a circumference thereof, wherein the diameter has a corresponding relationship to an outside can diameter of cans that have lids engaged therewith through operation of the machine,
   an axially extending plug bore, wherein the plug bore includes an axially centered plug bore opening at an axial end of the can plug opposed of the plug base,
  a seaming chuck gage, wherein the seaming chuck gage includes
   an axially extending stem, and
   a head,
   wherein the stem extends in the plug bore opening and is axially movable in the plug bore,
   wherein the head is in axially centered operatively supported connection with the stem,
   wherein the head includes
    an annular axially centered head wall, wherein the head wall includes an outer annular axially tapered head wall surface, wherein the outer annular axially tapered head wall surface
is axially and radially disposed outwardly from stem,
is smaller in diameter with increased axial distance away from the can plug,
is configured in the operative position of the head to engage in axially centered relation, an annular vertically extending chuck surface of a seaming chuck of the machine,
wherein the head wall further includes an annular inner head wall surface, wherein the inner head wall surface annularly bounds an axially centered head recess,
wherein the head recess
extends axially inward in the head from a head recess opening,
has an inside head recess diameter greater than a knockout pad diameter of a knockout pad that extends in centered relation of the seaming chuck of the machine,
extends axially from the head recess opening to a head recess floor,
wherein the head recess floor is axially disposed away from the knockout pad when the outer annular axially tapered head wall surface is engaged with the seaming chuck and the knockout pad is disposed in a downward operational position,
a spring, wherein the spring
is in operative connection with the can plug and the stem,
is operative to axially bias the head into engagement with the seaming chuck and the plug base into engagement with the lower chuck,
whereby the tool is enabled to be positioned at a makeup rotational position of the turret of the machine, at which position during operation of the machine a can lid is positioned in engaged axially centered overlying relation of a can body opening, and whereby a desired distance between the plug reference surface and the entire semicircular turret pocket surface can be set without removal from the machine of any of the seaming chuck, the knockout pad or a seaming lever.

2. The apparatus according to claim 1
wherein the plug base is in fixed operative connection with at least one centering projection,
wherein the at least one centering projection
extends parallel to the axis of the can plug,
is configured to engage at least a portion of an outer annular periphery of the lower chuck in axially and rotatably movable relation,
whereby the at least one centering projection is usable to axially center the plug reference surface with respect to the lower chuck.

3. The apparatus according to claim 1
wherein the plug base is in fixed operative connection with at least one radially extending foot,
wherein each foot includes in axial cross-section a centering projection,
wherein the centering projection
extends generally parallel to the central axis of the can plug,
is configured to engage an annular periphery of the lower chuck in relatively rotationally movable relation,
wherein engagement of the annular periphery of the lower chuck and the centering projection is operative to axially center the plug reference surface relative to the lower chuck.

4. The apparatus according to claim 1
wherein the plug base is in fixed operative connection with a plurality of equally angularly spaced radially extending feet,
wherein each of the radially extending feet
extends radially outward of the plug base,
includes in axial cross-section a centering projection,
wherein each centering projection
extends generally parallel to a central axis of the can plug,
is configured to engage an annular periphery of the lower chuck in relatively rotationally movable relation,
wherein engagement of the annular periphery of the lower chuck and each centering projection is operative to axially center the plug reference surface relative to the lower chuck.

5. The apparatus according to claim 1
wherein the can plug includes
a plug engagement aperture, wherein the plug engagement aperture
extends radially within the can plug from an outer surface of the can plug to the plug bore, and
is configured to receive a pin in radially movable relation therein,
wherein the stem includes a stem engagement aperture,
wherein the stem engagement aperture
extends radially in the stem, and
is configured to releasably engage the pin,
wherein with the pin in engagement with the stem engagement aperture, the pin is operative to hold the stem in an axially fixed retracted position in the plug bore against axial biasing force of the spring, and
wherein disengagement of the pin and the stem engagement aperture enables the head of the seaming chuck gage to axially move from the retracted position, whereby the head is movable into engagement with the seaming chuck.

6. The apparatus according to claim 1
wherein the tool further includes
a pin,
wherein the can plug includes
a plug engagement aperture, wherein the plug engagement aperture
extends radially within the can plug from an outer surface portion of the can plug to the plug bore, wherein the outer surface portion is axially disposed from the plug reference surface,
is configured to receive the pin in radially movable relation therein,
wherein the stem includes a stem engagement aperture,
wherein the stem engagement aperture
extends radially in the stem,
is configured to releasably engage the pin,
wherein with the pin in engagement with the stem engagement aperture,
a radially inward portion of the pin is operative to hold the stem in an axially fixed retracted position in the plug bore against axial biasing force of the spring, and
a radially outward portion of the pin is manually accessible outside the outer surface of the can plug, wherein radially outward movement of the outward portion of the pin is operative to disengage the inward portion of the pin and the stem engagement aperture,
wherein the head of the seaming chuck gage is enabled to axially move from the retracted position, whereby the head is movable into engagement with the seaming chuck.

7. The apparatus according to claim 1
wherein the can plug includes
a can plug recess at the axial end of the can plug opposed of the plug base,
a plug engagement aperture, wherein the plug engagement aperture
extends radially within the can plug from an outer surface of the can plug to the plug bore, and
is configured to receive a pin in radially movable relation therein,
wherein the stem includes a stem engagement aperture,
wherein the stem engagement aperture
extends radially in the stem, and
is configured to releasably engage the pin,
wherein with the pin in engagement with the stem engagement aperture,
the pin is operative to hold the stem in an axially fixed retracted position in
the plug bore against axial biasing force of the spring,
wherein in the axially fixed retracted position, the head of the seaming chuck gage extends in the can plug recess, and
wherein disengagement of the pin and the stem engagement aperture enables the head to axially move out of the can plug recess, whereby the head is enabled to move into engagement with the seaming chuck.

8. The apparatus according to claim 1
wherein the can plug includes
a plug engagement aperture, wherein the plug engagement aperture
extends radially within the can plug from an outer surface of the can plug to the plug bore, and
is configured to receive a pin in radially movable relation therein,
wherein the stem includes a stem engagement aperture,
wherein the stem engagement aperture
extends radially in the stem, and
is configured to releasably engage the pin,
wherein the head includes a visible indicator mark, wherein the indicator mark is angularly aligned with the stem engagement aperture,
wherein with the pin in engagement with the stem engagement aperture, the pin is operative to hold the stem in an axially fixed retracted position in the plug bore against axial biasing force of the spring, and
wherein disengagement of the pin and the stem engagement aperture enables the head of the seaming chuck gage to axially move from the retracted position, whereby the head is enabled to move into engagement with the seaming chuck.

9. The apparatus according to claim 1
wherein the head wall further includes an annular head projection portion,
wherein the annular head projection portion extends
parallel to the axis,
axially away from the can plug, and
radially inward of the outer annular axially tapered head wall surface,
wherein the annular head projection portion is configured to extend in centered relation in a chuck recess of the seaming chuck when the outer annular axially tapered head wall surface and the annular vertically extending chuck surface are in engagement.

10. The apparatus according to claim 1
wherein the head wall further includes a cylindrical head projection portion,
wherein the cylindrical head projection portion extends
parallel to the axis,
axially away from the can plug, and
radially inward of the outer annular axially tapered head wall surface,
wherein the head projection portion is axially bounded by an annular radially extending head top wall,
wherein the cylindrical head projection portion is configured to extend in axially centered relation in a chuck recess of the seaming chuck when the outer annular axially tapered head wall surface and the annular vertically extending chuck surface are in engagement.

11. The apparatus according to claim 1
wherein the head further includes
an annular roughened manual grip surface,
wherein the annular roughened manual grip surface is disposed on a head wall outer surface axially intermediate of the outer annular axially tapered head wall surface and the stem.

12. The apparatus according to claim 1
wherein the can plug includes
an outer recess surface,
wherein the outer recess surface
is angularly disposed on the can plug from the plug reference surface,
is radially disposed from the axis a recess radial distance, wherein the recess radial distance is less than a reference surface radial distance from the axis to the reference surface,
whereby the outer recess surface is alignable to be disposed in immediately adjacent facing relation with a can guide rail of the machine that extends adjacent to the turret pocket in the makeup rotational position.

13. The apparatus according to claim 1
wherein the can plug includes
an axially elongated outer recess surface,
wherein the outer recess surface
is angularly disposed on the can plug from the plug reference surface,
is radially disposed from the axis, a recess radial distance along an entire length of the outer recess surface, wherein the recess radial distance is less than a reference surface radial distance from the axis to the reference surface,
whereby the outer recess surface is alignable to be disposed in immediately adjacent facing relation with a can guide rail of the machine that extends adjacent to the turret pocket in the makeup rotational position.

14. The apparatus according to claim 1
wherein the tool further includes
a chain timing projection, wherein the chain timing projection extends radially outward on the can plug,
wherein the chain timing projection is configured such that with the tool in the makeup position the chain timing projection is positionable in immediately adjacent facing relation with a can engaging projection of a feed chain of the machine, whereby a chain tolerance distance between the chain timing projection and the can engaging projection can be verified.

15. The apparatus according to claim 1
wherein the tool further includes
a chain timing projection insert, wherein the chain timing projection insert
is removably mounted in fixed operative connection with the can plug, and
extends radially outward on a partial circumferential portion of the can plug,
wherein at least one dimension of the chain timing projection insert corresponds to a machine type associated with the machine,
wherein the chain timing projection insert is configured such that with the tool in the makeup position, the chain timing projection insert is positionable in immediately adjacent facing relation with a can engaging projection of a feed chain of the machine, whereby a chain tolerance distance between the chain timing projection insert and the can engaging projection can be verified.

16. The apparatus according to claim 1
wherein the stem within the plug bore opening is cylindrical and has an outside stem diameter,
wherein the plug bore in which the stem is located is cylindrical and has an inside bore diameter,
wherein the inside bore diameter is larger than the outside stem diameter by not greater than 0.003 inches.

17. The apparatus according to claim 1
wherein the stem within the plug bore opening has a cylindrical outside stem surface,
wherein the plug bore in which the stem is located has a cylindrical bore inside surface,
wherein at least one annular resilient seal extends radially intermediate of the outside stem surface and the bore inside surface,
wherein at least one air vent opening extends between the plug bore and an external surface of the can plug, wherein vacuum is not created in the plug bore as a result of stem movement.

18. The apparatus according to claim 1
wherein the head of the seaming chuck gage and the seaming chuck of the machine correspond to a can lid configuration of a first type,
and further comprising:
a kit including:
a further seaming chuck gage including a further head, wherein the further head of the further seaming chuck gage corresponds to a further seaming chuck that corresponds to a can lid configuration of a second type that is different from the first type.

19. The apparatus according to claim 1
wherein the reference surface of the can plug has a corresponding relationship to an outside can diameter of a can of a first can size,
and further comprising:
a kit including:
a further can plug, wherein the further can plug has a further generally cylindrical plug reference surface, wherein the further reference surface of the further can plug has a corresponding relationship to an outside can diameter of a further can of a second can size that is different from the first can size.

20. The apparatus according to claim 1
wherein the tool further includes
a chain timing projection insert, wherein the chain timing projection insert
is removably mounted in operative fixed connection with the can plug, and
extends radially outward on a partial circumferential portion of the can plug,
wherein at least one dimension of the chain timing projection insert corresponds to a machine type associated with the machine,
wherein the chain timing projection insert is configured such that with the tool in the makeup position the chain timing projection insert is positionable in immediately adjacent facing relation with a can engaging projection of a feed chain of the machine, whereby a chain tolerance distance between the chain timing projection insert and the can engaging projection can be verified,
and further comprising:
a kit including:
a further chain timing projection insert, wherein the further chain timing projection insert has at least one dimension that is different from the chain timing projection insert and is removably mountable in operative fixed connection with the can plug,
wherein the further chain timing projection insert corresponds to a further machine type that is different from the machine type of machine.

21. Apparatus comprising:
a set up tool for a can seamer machine, including
a generally cylindrical can plug, wherein the can plug includes
a plug base configured to engage a lower chuck of the machine in axially centered supported relation,
a plug outer reference surface, wherein the plug reference surface
is uniformly disposed a surface radial distance from a central axis of the tool about at least one half of a circumference of the can plug,
is uniformly disposed an axial distance from the plug base, wherein the axial distance corresponds to a semicircular turret pocket surface that bounds an interior area of a turret pocket of a rotatable turret of the machine,
an axially centered, axially extending plug bore, wherein the plug bore includes an axially centered plug bore opening at an axial end of the can plug opposed of the plug base,
a seaming chuck gage, wherein the seaming chuck gage includes
an axially extending stem, wherein the stem extends in and is axially movable in the plug bore,
a spring,
wherein the spring extends in the plug bore and axially biases the stem outward from the plug bore opening,
wherein the seaming chuck gage further includes a head,
wherein the head is in axially centered fixed operative connection with the stem,
wherein the head includes
an annular axially centered head wall, wherein the head wall includes an outer annular axially tapered head wall surface, wherein the outer annular axially tapered head wall surface
is smaller in diameter with increased axial distance away from the can plug, and
is configured to engage in axially centered relation a seaming chuck of the machine,
wherein the spring is operative to axially bias the head into engagement with the seaming chuck whereby the head is held in engaged centered relation with the seaming chuck, a head recess, wherein the head recess is sized to accept therein without contact, a knockout pad that extends axially outward from and in centered relation of the seaming chuck, whereby the tool is enabled to be positioned in the machine at a makeup rotational position of the turret at which during operation of the machine a can lid is positioned in engaged axially centered overlying relation of a can body opening, and whereby the desired distance between the plug reference surface and the semicircular turret pocket surface can be set without removal from the machine of any of the seaming chuck, the knockout pad or a seaming lever.

22. The apparatus according to claim 21 wherein the tool further includes a releasable catch, wherein the releasable catch is selectively operative to hold the head in a retracted position in which the head is held axially disposed away from the seaming chuck, against the biasing force of the spring.

23. The apparatus according to claim 21 wherein the plug base includes an axially extending plug base recess therein, wherein the plug base recess is configured to receive the lower chuck therein, wherein the plug base recess is configured to hold the lower chuck in axially centered relation within the recess while enabling relative rotation of the plug base and the lower chuck about the axis.

24. The apparatus according to claim 21 wherein the plug outer reference surface has a corresponding relationship to an outside can diameter of a can of a first can size, and further comprising: a further generally cylindrical can plug, wherein the further can plug has a further plug outer reference surface, wherein the further reference surface has a corresponding relationship to an outside can diameter of a further can of a second can size that is different from the first can size.

* * * * *